(12) United States Patent
Saishu

(10) Patent No.: US 7,786,953 B2
(45) Date of Patent: Aug. 31, 2010

(54) APPARATUS DISPLAYING THREE-DIMENSIONAL IMAGE

(75) Inventor: Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1146 days.

(21) Appl. No.: 11/385,712

(22) Filed: Mar. 22, 2006

(65) Prior Publication Data

US 2006/0238863 A1    Oct. 26, 2006

(30) Foreign Application Priority Data

Mar. 25, 2005   (JP)   ............................. 2005-089646

(51) Int. Cl.
*G09G 5/00*   (2006.01)
(52) U.S. Cl. ............................. 345/4; 359/463; 348/56
(58) Field of Classification Search .................. 345/4–6; 359/462–465, 471, 472; 348/42, 51, 54–59
See application file for complete search history.

(56) References Cited

U.S. PATENT DOCUMENTS

| 5,825,541 A * | 10/1998 | Imai ........................... 359/464 |
| 2004/0252374 A1 | 12/2004 | Saishu et al. |
| 2005/0105179 A1 | 5/2005 | Taira et al. |
| 2005/0259323 A1 | 11/2005 | Fukushima et al. |

FOREIGN PATENT DOCUMENTS

| JP | 6-78342 | 3/1994 |
| JP | 9-43540 | 2/1997 |
| JP | 10-206786 | 8/1998 |
| JP | 10-206795 | 8/1998 |
| JP | 10-253926 | 9/1998 |
| JP | 10-282453 | 10/1998 |

OTHER PUBLICATIONS

English Translation of JP 10-206795; Mar. 25, 2009.*
Hoshino, H. et al., "Analysis of Resolution Limitation of Integral Photography," J. Opt. Soc. Am. A, vol. 15, No. 8, pp. 2059-2065, (Aug. 1998).
Notification of Reasons for Rejection issued by the Japanese Patent Office on Dec. 2, 2008, for Japanese Patent Application No. 2005-089646, and English-language translation thereof.

* cited by examiner

*Primary Examiner*—Jimmy H Nguyen
(74) *Attorney, Agent, or Firm*—Finnegan, Henderson, Farabow, Garrett & Dunner, L.L.P.

(57) ABSTRACT

In a three-dimensional image display apparatus in which a lenticular plate and shutter device are arranged in front of a display module, one frame image is displayed using n field images. To display each field image, a shutter device is driven to substantially simultaneously open a group of shutter elements for every n lenses along a horizontal direction. Thus, light beams are transmitted from lenses through the shutter elements to an observing zone. The group of the opened shutter elements is sequentially changed in response to n switchings of the field. The switching of shutter elements is synchronized with the pixels on the display surface sequentially rewritten from top to bottom by linear sequential driving during the switching of the field. The elemental image is projected on the viewing zone via the lenses and the shutter elements.

10 Claims, 14 Drawing Sheets

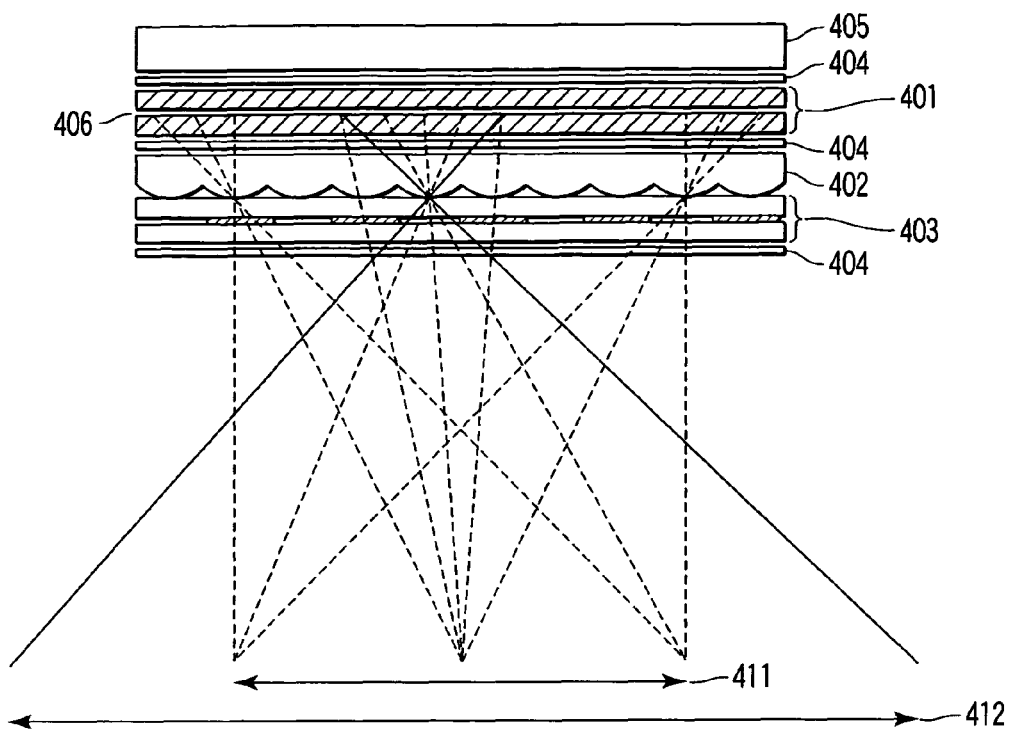
F I G. 1
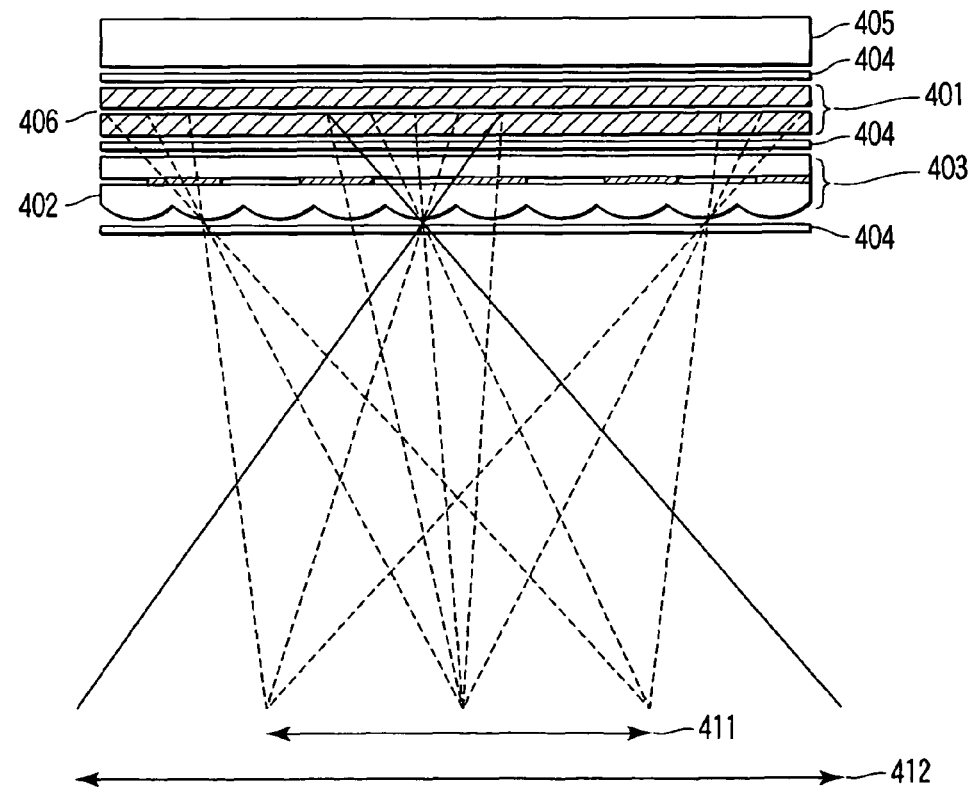
F I G. 2

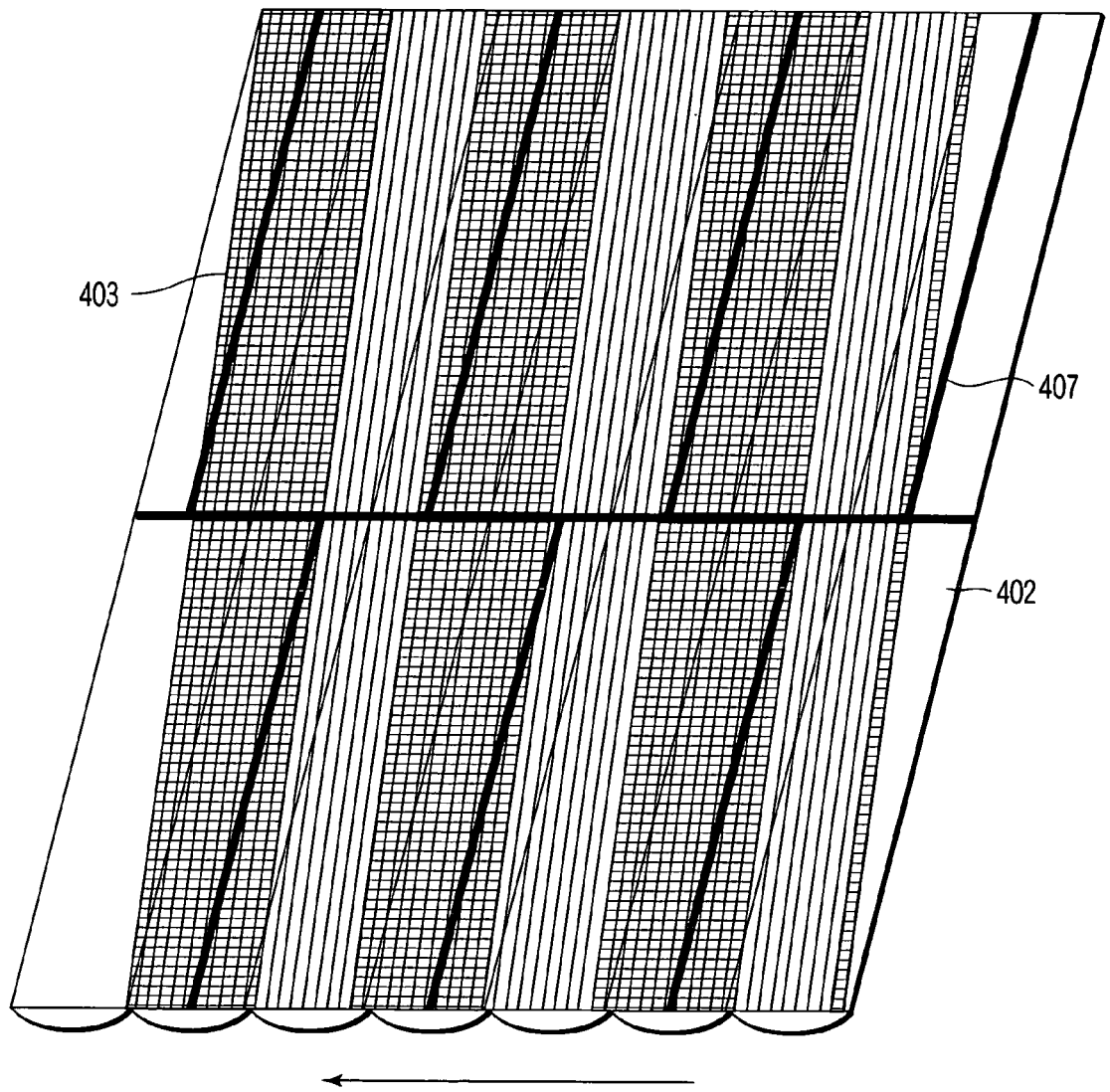
F I G. 13

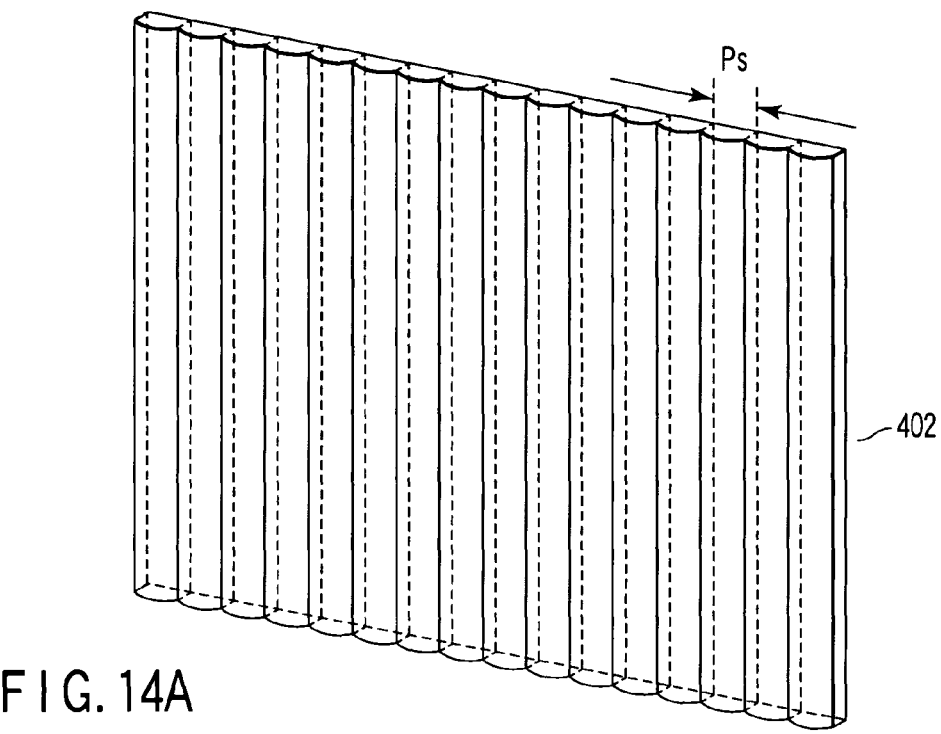
F I G. 14A
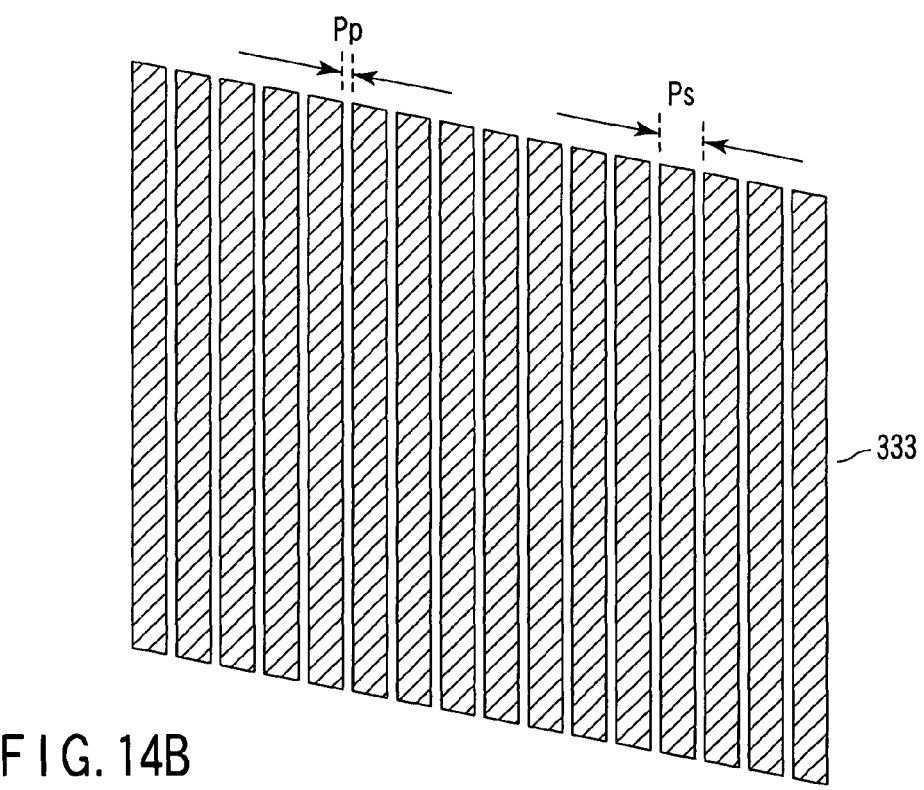
F I G. 14B

APPARATUS DISPLAYING THREE-DIMENSIONAL IMAGE

CROSS-REFERENCE TO RELATED APPLICATIONS

This application is based upon and claims the benefit of priority from prior Japanese Patent Application No. 2005-089646, filed Mar. 25, 2005, the entire contents of which are incorporated herein by reference.

BACKGROUND OF THE INVENTION

1. Field of the Invention

The present invention relates to an apparatus that displays three-dimensional images, and in particular, to a three-dimensional image display apparatus driven in a time division multiplexing manner.

2. Description of the Related Art

There are various known systems for three-dimensional-vision image display apparatuses that can display three-dimensional motion pictures, that is, three-dimensional displays. In recent years, in particular, there has been a growing demand for a three-dimensional-vision image display system which is of a flat panel type and which does not require any dedicated glasses or the like. In relatively easily feasible known systems, a beam control device is installed immediately in front of a display panel (display apparatus) such as a direct-vision or projective liquid crystal display apparatus or a plasma display apparatus which has fixed pixel positions; the beam control device controls beams from the display panel so that the beams are directed toward an observer.

The beam control device is generally called a parallax barrier. The beam control device controls beams so that different images are visible depending on angle even from the same position on the beam control device. Specifically, a slit array, a lenticular sheet, or a cylindrical lens array is used to provide only a lateral parallax, that is, a horizontal parallax. A pinhole array or a lens array is used to provide a vertical parallax in addition to the horizontal parallax. Moreover, systems using the parallax barrier are classified into a two-view (binocular) type, a multiview type, a super-multiview system corresponding to the multiview type provided with a super-multiview condition, and integral photography (referred to as IP below). The basic principle of these systems is virtually the same as that was invented about 100 years ago and that has been used for three-dimensional photography since then.

For a multiview system or one-dimensional IP (IP with horizontal parallax), there is a tradeoff relationship between viewing zone size, resolution, and depth amount as shown in J. Opt. Soc. Am. A vol. 15, p. 2059 (1998). It is difficult to maintain all the three characteristics at sufficient levels. Thus, a method has been proposed in Jpn. Pat. Appln. KOKAI Publication Nos. 10-206795 and 10-282453; this method can increase one of the viewing zone size, resolution, and depth amount by a factor of n using a time division multiplexing method at the cost of a decrease in luminance to 1/n. However, disadvantageously, this method insufficiently deals with crosstalk for each field resulting from time division multiplexing.

As described above, a problem with the conventional three-dimensional image display apparatus based on the time division multiplexing system is that it insufficiently deals with crosstalk for each field resulting from time division.

BRIEF SUMMARY OF THE INVENTION

It is an object of the present invention to provide a three-dimensional display apparatus based on a multiview system or a one-dimensional IP system, the apparatus being capable of increasing any one of viewing zone size, resolution, and depth amount by a factor of n, while suppressing crosstalk.

According to a first aspect of the present invention, there is provided a three-dimensional image display apparatus comprising:

a display module having a display surface on which pixels are arranged in rows and columns;

a display driver configured to generate field image signals to the display module, the display surface being scanned along the column in accordance with each of the field image signals to display elemental images on the pixels, respectively, and form a field image on the display surface, the field image being sequentially rewritten to form a frame image;

a lens array installed in front of the display module and having a plurality of lenses which include optical apertures linearly extended along the column and which are arranged along the row;

a shutter device installed on a convex surface side of the lens array and including a plurality of shutter elements which are extended substantially along the column and arranged along the row or in rows and columns to have a predetermined relationship with the lenses; and a shutter driver configured to drive the shutter device to open a group of the shutter elements and close the other group of the shutter elements, simultaneously, and display each of the field image from the shutter device, the group of the shutter elements transmitting light beams from the elemental images through the lenses, while the other group of the closed shutter elements blocks the light beams from the elemental images through the lenses, the shutter driver sequentially changing the group of the opened shutter elements in synchronization with the scanning of the display surface, the elemental images being sequentially projected on a observing zone from the display apparatus to form the three-dimensional image.

According to a second aspect of the present invention, there is provided a three-dimensional image display apparatus comprising:

a display module having a display surface on which pixels are arranged in rows and columns;

a display driver configured to generate field image signals to the display module, the display surface being scanned along the column in accordance with each of the field image signals to display elemental images on the pixels, respectively, and form a field image on the display surface, the field image being sequentially rewritten to form a frame image;

a slit plate installed in front of the display module and having a plurality of slits linearly extended substantially along the columns and arranged along the rows;

a shutter device including a plurality of shutter elements which are extended substantially along the column and arranged along the row or in rows and columns to have a predetermined relationship with the slits; and a shutter driver configured to drive the shutter device to open a group of the shutter elements and close the other group of the shutter elements, simultaneously, and display each of the field image from the shutter device, the group of the shutter elements transmitting light beams from the elemental images through the slits, while the other group of the closed shutter elements blocks the light beams from the elemental images through the slits, the shutter driver sequentially changing the group of the opened shutter elements in synchronization with the scanning of the display surface, the elemental images being sequentially projected on a observing zone from the display apparatus to form the three-dimensional image.

According to a third aspect of the present invention, there is provided a method for displaying a three-dimensional image, comprising:

a display module having a display surface on which pixels are arranged in rows and columns;

a lens array installed in front of the display module and having a plurality of lenses which include optical apertures linearly extended along the column and which are arranged along the row; and a shutter device installed on a convex surface side of the lens array and including a plurality of shutter elements which are extended substantially along the column and arranged along the row or in rows and columns to have a predetermined relationship with the lenses;

the method comprising:

generating field image signals to the display module, the display surface being scanned along the column in accordance with each of the field image signals to display elemental images on the pixels, respectively, and form a field image on the display surface, the field image being sequentially rewritten to form a frame image;

driving the shutter device to open a group of the shutter elements and close the other group of the shutter elements, simultaneously, and display each of the field image from the shutter device, the group of the shutter elements transmitting light beams from the elemental images through the lenses, while the other group of the closed shutter elements blocks the light beams from the elemental images through the lenses; and changing the group of the opened shutter elements in synchronization with the scanning of the display surface, sequentially, the elemental images being sequentially projected on a observing zone from the display apparatus to form the three-dimensional image.

According to a fourth aspect of the present invention, there is provided a method for displaying a three-dimensional image, comprising:

a display module having a display surface on which pixels are arranged in rows and columns;

a slit plate installed in front of the display module and having a plurality of slits linearly extended substantially along the columns and arranged along the rows; and a shutter device including a plurality of shutter elements which are extended substantially along the column and arranged along the row or in rows and columns to have a predetermined relationship with the slits;

the method comprising:

generating field image signals to the display module, the display surface being scanned along the column in accordance with each of the field image signals to display elemental images on the pixels, respectively, and form a field image on the display surface, the field image being sequentially rewritten to form a frame image;

driving the shutter device to open a group of the shutter elements and close the other group of the shutter elements, simultaneously, and display each of the field image from the shutter device, the group of the shutter elements transmitting light beams from the elemental images through the slits, while the other group of the closed shutter elements blocks the light beams from the elemental images through the slits; and changing the group of the opened shutter elements in synchronization with the scanning of the display surface, sequentially, the elemental images being sequentially projected on a observing zone from the display apparatus to form the three-dimensional image.

BRIEF DESCRIPTION OF THE SEVERAL VIEWS OF THE DRAWING

FIG. 1 is a horizontal sectional view schematically showing a three-dimensional image display apparatus in accordance with a first embodiment of the present invention;

FIG. 2 is a horizontal sectional view schematically showing a three-dimensional image display apparatus in accordance with a second embodiment of the present invention;

FIG. 13 is a schematic diagram schematically showing another example of the positional relationship between a shutter and lenses integrated into a three-dimensional display apparatus in accordance with a fifth embodiment of the present invention;

FIGS. 14A and 14B are perspective views schematically showing a beam control device in accordance with an embodiment of the present invention.

DETAILED DESCRIPTION OF THE INVENTION

Figure 3:
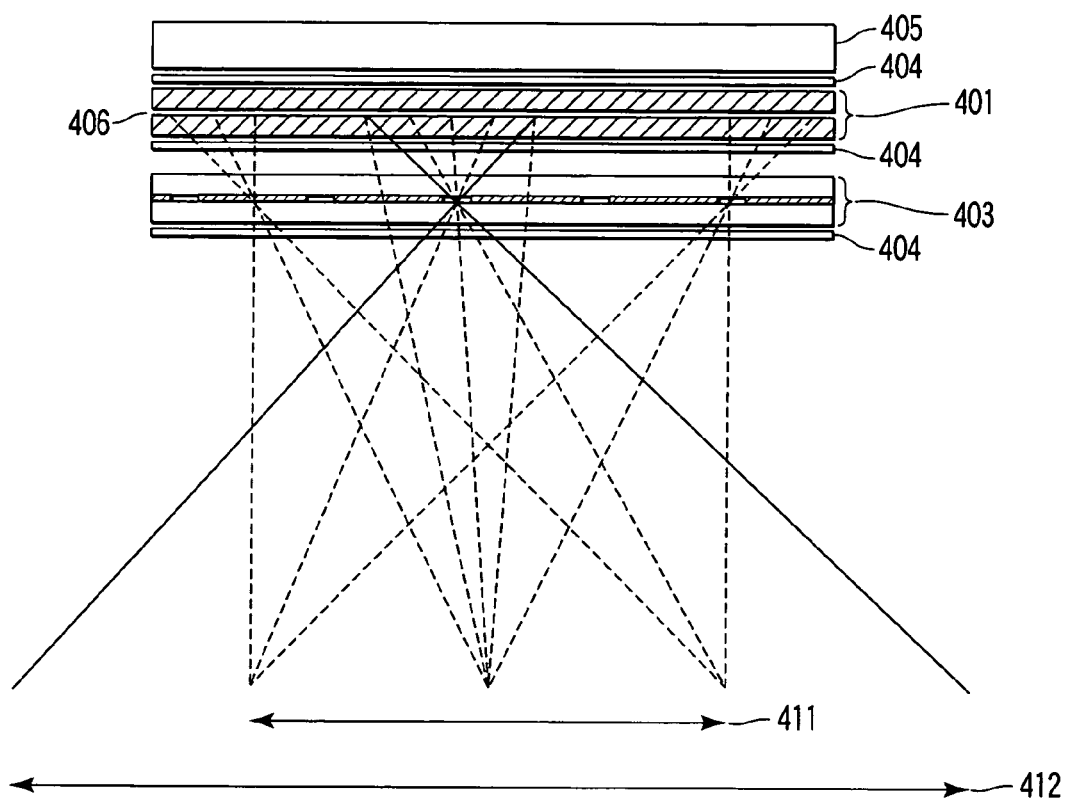
FIG. 3 is a horizontal sectional view schematically showing a three-dimensional image display apparatus in accordance with a third embodiment of the present invention.

A detailed description will be given below of an apparatus that displays three-dimensional images in accordance with an embodiment of the present invention.

FIG. 1 is a horizontal sectional view schematically showing a three-dimensional image display apparatus in accordance with a first embodiment of the present invention.

In the arrangement shown in FIG. 1, the bottom corresponds to an actual observer side. The top corresponds to a three-dimensional display apparatus side. In the three-dimensional display apparatus, a liquid crystal panel, i.e., a liquid crystal display module is adopted as a display module. As is well known, the liquid crystal panel is composed of a backlight unit 405, two polarizing plates 404, and a liquid crystal cell 401. In FIG. 1, reference numeral 406 denotes a pixel surface on which pixels are displayed, i.e. a display surface of the liquid crystal panel. The pixel surface 406 is substantially considered to be a surface on which pixels are arranged in a matrix in horizontal and vertical directions. Such a display apparatus is not limited to the liquid crystal panel. Naturally, the display module may obviously be a light emitting type, for example, an organic EL panel, a plasma display module, or an electron emission type display module.

It should be noted that in such a light emitting type display module, the backlight unit 405 is not provided in the display module.

A lenticular plate 402 is installed in front of the liquid crystal panel as a beam control device that controls beams from the liquid crystal panel. A pixel surface 406 is placed at the focal plane or image plane of lenses of the lenticular plate 402 or in the vicinity of these surfaces. Here, the lenses of the lenticular plate 402 have a function for controlling the direction of beams from the liquid crystal panel. Since the lenses provide functions similar to those of a slit plate except a function for enlarging an image, they are also called optical apertures. The beam control device is not limited to such a lenticular plane 402 but may be a slit plate in which slits are formed. In the slit plate, the slits correspond to the optical apertures.

The lenses of the lenticular plate 402 are extended along a substantially vertical direction, i.e. across the column. A plurality of lenses are arranged along a substantially horizontal direction, i.e. across the row. The lenses of the lenticular plate 402 may be of a single convex type or a double-convex type. A similar structure is employed in a normal three-dimensional display apparatus that displays an image without any time division multiplexing. Here, the extension of the lenses of the lenticular plate 402 in a substantially vertical direction, i.e., across the column is not limited to the case where the extending direction coincides with the vertical direction. The extension includes the case where the lenses are inclined at a certain angle to the vertical direction as described with reference to FIG. 13. If the lenses of the lenticular plate 402 are extended at the certain angle to the vertical direction, a plurality of obliquely extended lenses are arranged in the horizontal direction (across the row).

To display an image in a time division multiplexing, the shutter cell 403 is installed on a convex lens surface side of the lenticular plate 402. Further, the polarizing plate 404 is installed in front of the shutter cell 403. A transmission axis of the shutter cell 403 is set to extend parallel or perpendicular to a transmission axis of the polarizing plate 404 in front of the liquid crystal panel. The shutter cell 403 has a structure in which a plurality of shutter elements are arranged. The shutter elements are extended along a substantially vertical direction and opposite the lenses of the lenticular plate 402. The shutter elements are arranged along a substantially horizontal direction. To display an image in a time division multiplexing while suppressing crosstalk, the plurality of shutter elements are associated with the lenses. That is, the area of one lens as viewed from the front is equal to that of a plurality of shutter elements. As described below for an example with reference to FIGS. 4 to 7, an elongate area corresponding to one lens may be divided into a plurality of parts corresponding to a plurality of shutter elements arranged in the vertical direction. Further, as described below for a variation with reference to FIG. 11, the shutter elements of the shutter cell 403 may be arranged obliquely opposite the lenses of the lenticular plate 402 so as to incline at a certain angle relative to the lenses. Accordingly, as in the case of the lenses of the lenticular plate 402, the extension of the shutter elements in the substantially vertical direction is not limited to the case where the extending direction coincides with the vertical direction. The extension includes the case where the shutter elements are inclined at the certain angle to the vertical direction (across the column) as described with reference to FIG. 11. If the shutter elements are extended at the certain angle to the vertical direction, the obliquely extended shutter elements are arranged in the horizontal direction (across the row).

In FIG. 1, the shaded and white parts schematically shown inside the shutter cell 403 represent a transmitted state and a shutoff state, respectively, in a certain field. In this example, one frame is divided into two fields, and the shutter cell 403 is opened and closed so that half of all the lenses (the even or odd numbered lenses) per field are in the transmitted state.

In the three-dimensional display apparatus shown in FIG. 1, a viewing zone 412 is twice as large as a viewing zone 411 that is not processed in a time division multiplexing. By designing the viewing zone 411 so that its size is substantially equal to that obtained without any time division multiplexing, it is possible to reduce lens pitch to half while doubling resolution. Alternatively, by doubling lens focal distance and the number of pixels per lens (beam density), it is possible to double depth reproduction range. When the shutter cell is placed on the convex surface side of the lenticular plate 402 in proximity to the lenticular plate 402, it is possible to suppress the positional deviation between the lens and shutter associated with the viewing position.

FIG. 2 is a horizontal sectional view schematically showing a three-dimensional image display apparatus in accordance with a second embodiment of the present invention. In the arrangement shown in FIG. 2, the bottom corresponds to the observer's side, while the top corresponds to the three-dimensional display apparatus side as in the case of FIG. 1. As in the case of the first embodiment, a liquid crystal panel is adopted as a display apparatus. The shutter cell 403 integrated with the lenticular plate 402 is installed in front of the liquid crystal panel. The pixel surface 406 is placed at the focal plane or image plane of lenses of the lenticular plate 402 or in the vicinity of these surfaces so that an image from the lenticular plate 402 is projected in front of the apparatus. In such a structure, it is possible to suppress the positional deviation between the lens and shutter associated with the viewing position.

In the structure shown in FIG. 2, the polarizing plate 404 is installed in front of the shutter cell 403. In the structure shown in FIG. 2, as in the case of the first embodiment, the size of the viewing zone 412, the resolution, or the depth reproduction range can be doubled compared to that achieved without any time division multiplexing.

Also in the example of structure shown in FIG. 2, one frame is divided into two fields, and the shutter cell 403 is opened and closed so that half of all the lenses (the even or odd numbered lenses) per field are in the transmitted state.

FIG. 3 is a horizontal sectional view schematically showing a three-dimensional image display apparatus in accordance with a third embodiment of the present invention. In the arrangement shown in FIG. 3, as in the case of FIGS. 1 and 2, the bottom corresponds to the observer's side, while the top corresponds to the three-dimensional display apparatus side as in the case of FIGS. 1 and 2. As in the case of the first embodiment, a liquid crystal panel is adopted as a display apparatus. Instead of the lenticular plate 402, the shutter cell 403 is installed in front of the liquid crystal panel; the shutter cell 403 is also used as a slit serving as a beam control device. Moreover, the polarizing plate 404 is placed in front of the shutter cell 403.

In the structure shown in FIG. 3, as in the case of the first embodiment, the size of the viewing zone 412, the resolution, or the depth reproduction range can be doubled compared to that achieved without any time division multiplexing.

Figure 4A:
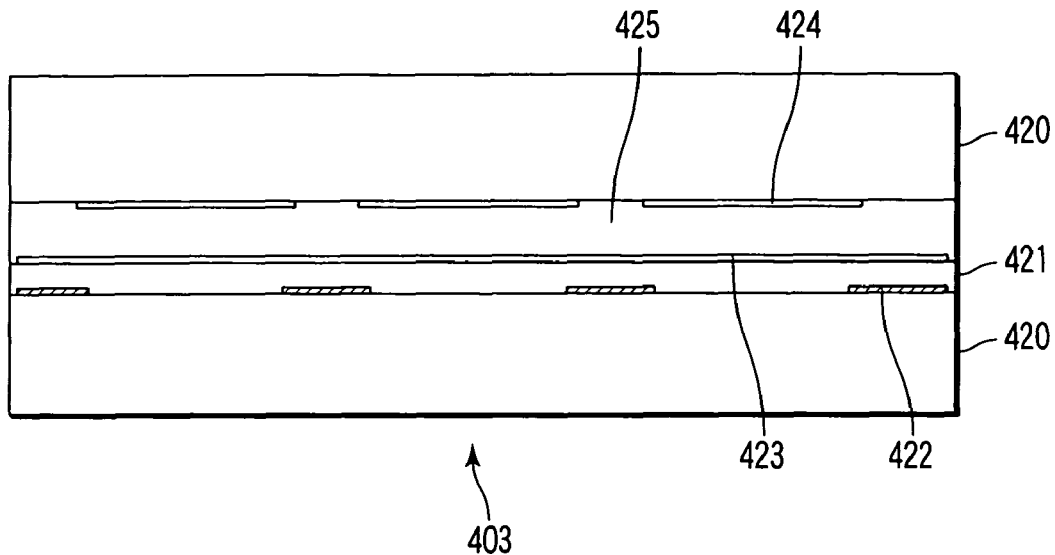
FIG. 4A is horizontal sectional view schematically showing a structure of a shutter integrated into the three-dimensional image display apparatuses shown in FIGS. 1 to 3.
Figure 4B:
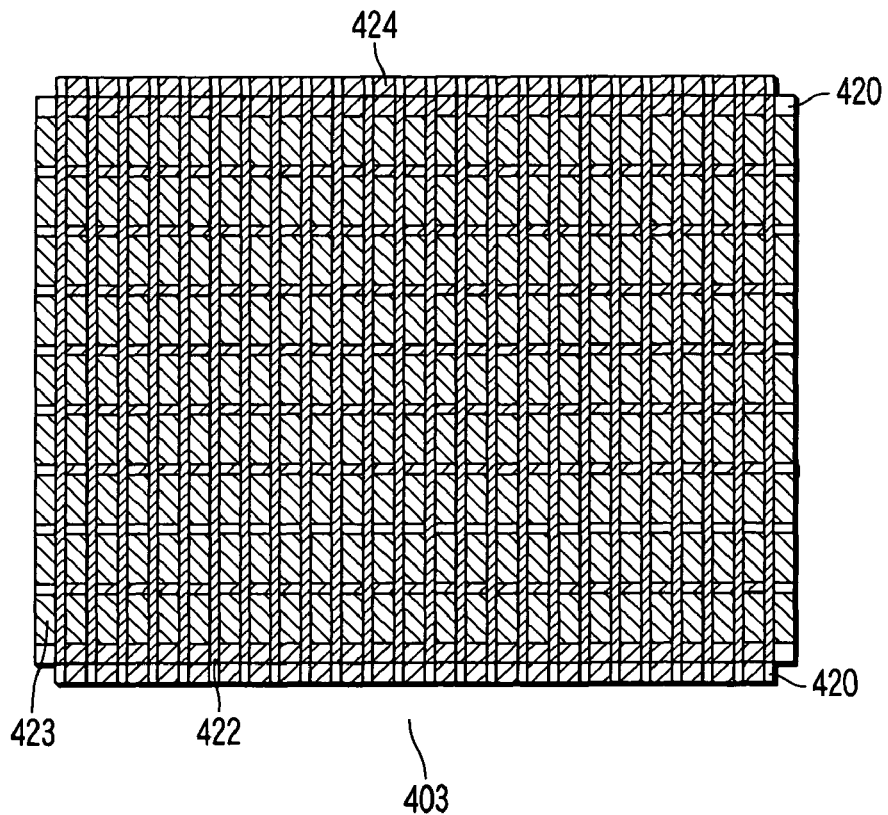
FIG. 4B is a front view schematically showing the shutter shown in FIG. 4A.

FIGS. 4A and 4B are horizontal sectional views schematically showing a structure of the shutter 403 integrated into the three-dimensional image display apparatuses shown in FIGS. 1 to 3. The shutter cell 403 is composed of two substrates 420 such as two glass plates or the like arranged opposite each other. Electrodes 423 and 424 are formed on inner surfaces of the two substrates 420; the electrodes 423 are extended in a substantially horizontal direction, while the electrodes 424 are extended in a substantially vertical direction. The shutter elements of the shutter cell 403 are defined by intersecting portions between the electrodes 423, extended in the substantially horizontal direction, and the electrodes 424, extended in the substantially vertical direction. The shutter elements are opened and closed depending on voltages applied to the electrodes 423 and 424. Accordingly, as described below for a variation, in an arrangement in which the shutter elements are relatively obliquely to the lenses of the lenticular plate, the electrodes 424 are obliquely formed on the substrate 420 so as to incline a certain angle to the vertical direction. The electrodes 423, extended in the substantially horizontal direction, may be solid; a single undivided electrode 423 may be used.

In this example of structure, the substrates 420 provided with the horizontal electrodes 423 is installed on the observer side. The horizontal electrode 423 is formed on an insulating layer 421. Light blocking portions 422 are formed at the bottom of the insulating layer 421 at predetermined intervals along a substantially vertical direction. A liquid crystal material 425 is filled between the substrates 420. The vertical electrodes 424 are arranged opposite the lenses of the lenticular plate 402. That is, the vertical electrodes 424 are arranged on the substrate 420; the vertical electrodes 424 are horizontal segments the number of which corresponds to the lenses of the lenticular plate 402. The pitch of the vertical electrodes 424 is set substantially equal to that of the lenses. Here, the term "substantially equal" is not limited to the case where the pitches are physically the same. The term includes the case where the vertical electrodes 424 are arranged at a pitch slightly smaller than the lens pitch if the vertical electrodes 424 are in front of the lenses, while the vertical electrodes 424 are arranged at a pitch slightly larger than the lens pitch if the vertical electrodes 424 are behind of the lenses, considering that the size of each of the lenses of the lenticular plate 402 as viewed from an assumed viewing distance at which the observer makes observations is different from that of each of the vertical electrodes 424 as viewed from the assumed viewing distance. The difference in size between the lens of the lenticular plate 402 and the vertical electrode 424 as viewed from the assumed visual distance means that since there is a certain distance between the lens of the lenticular plate 402 and the vertical electrode 424, when an image from the lens of the lenticular plate 402 is projected on a virtual surface on which the vertical electrode 424 is placed, with reference to the observer's eye point, there is a slight difference in size between the original image and the projected image.

The light blocking portions 422 are extended on one of the substrates 420 in a substantially vertical direction and arranged at predetermined intervals along a substantially horizontal direction. The vertical electrodes 424 are similarly extended on the other substrate 420 in a substantially vertical direction and arranged at predetermined intervals along a substantially horizontal direction. In this case, each of the light blocking portions 422 is located opposite the gap between the vertical electrodes 424 and formed to have a width slightly larger than the gap. The light blocking portions 422 need not necessarily be formed but is effective in preventing the crosstalk between the adjacent lenses. Alternatively, the light blocking portions 422 may be formed in a matrix so as to cover the gap between the horizontal electrodes 423. Although depending on the response speed of the liquid crystal or the number of time divisions, several to several tens of horizontal electrodes 423 are extended in a substantially horizontal direction and arranged at predetermined intervals in a substantially vertical direction. The number of electrodes resulting from the horizontal division, that is, the number of shutter element rows, is preferably smaller than that of pixel rows in an elemental image display module such as LCD by one or two orders of magnitude. If the number of shutter element rows is equivalent to that of pixel rows, a problem such as the appearance of an interference pattern may occur.

The shutter cell 403, shown in FIGS. 4A and 4B, may be configured as a normally open shutter that is closed upon the application of a signal voltage or a normally closed shutter that is opened upon the application of the signal voltage. For the normally open shutter, when the signal voltage is applied to the vertical electrode 424 and a voltage is applied to between the vertical electrode 424 and the horizontal electrode 423, the liquid crystal in the liquid crystal material is oriented to block beams incident on the liquid crystal. This blocks beams from the lens lying opposite the vertical electrode 424. For the normally closed shutter, when the signal voltage is applied to the vertical electrode 424 and a voltage is applied to between the vertical electrode 424 and the horizontal electrode 423, the liquid crystal in the liquid crystal material 425 is oriented to transmit beams incident on the liquid crystal. This transmits beams from the lens lying opposite the vertical electrode 424.

Figure 5A:
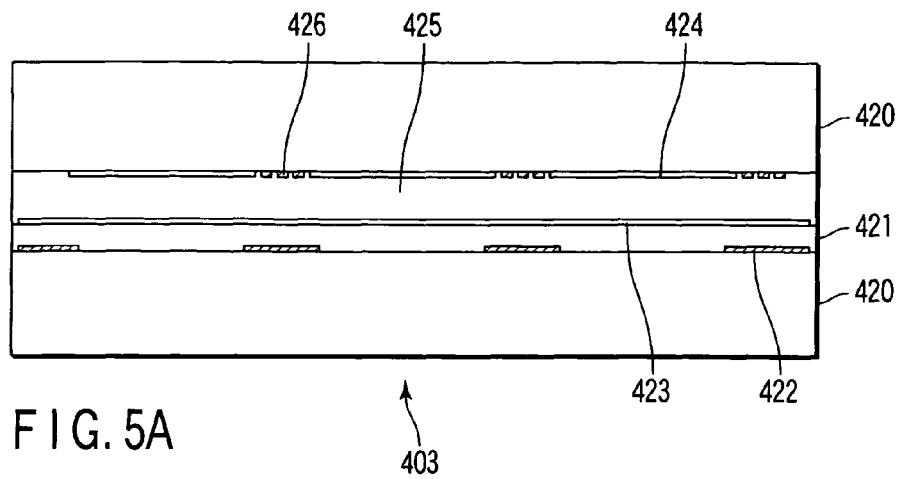
FIG. 5A is a horizontal sectional view schematically showing another structure of the shutter integrated into the three-dimensional image display apparatuses shown in FIGS. 1 to 3.
Figure 5B:
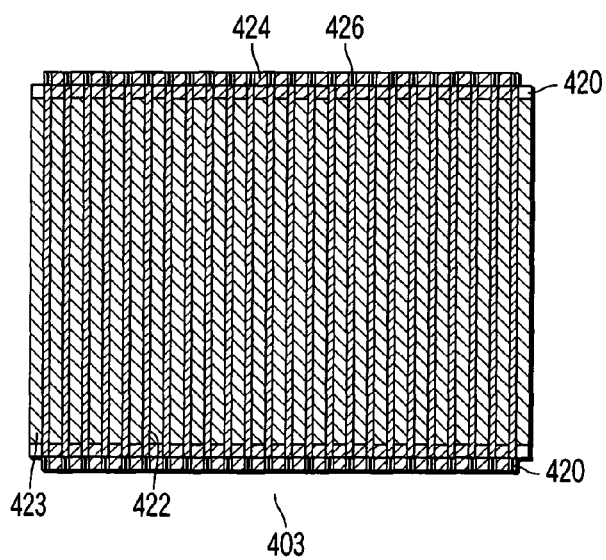
FIG. 5B is a front view schematically showing another structure of the shutter integrated into the three-dimensional image display apparatus shown in FIG. 5A.

FIGS. 5A and 5B is a horizontal sectional view and a front view schematically showing another form of the shutter cell 403 which is applicable to the three-dimensional image display apparatuses in accordance with the first to third embodiments of the present invention. The shutter cell 403 is composed of the substrates 420 such as two glass plates or the like arranged opposite each other. The common electrode 423 and the vertical electrodes 424 are formed on the inner surfaces of the two substrates 420; the common electrode 423 has terminals in a substantially horizontal direction and the vertical electrodes 424 are individually formed for the respective shutter elements.

Figure 5C:
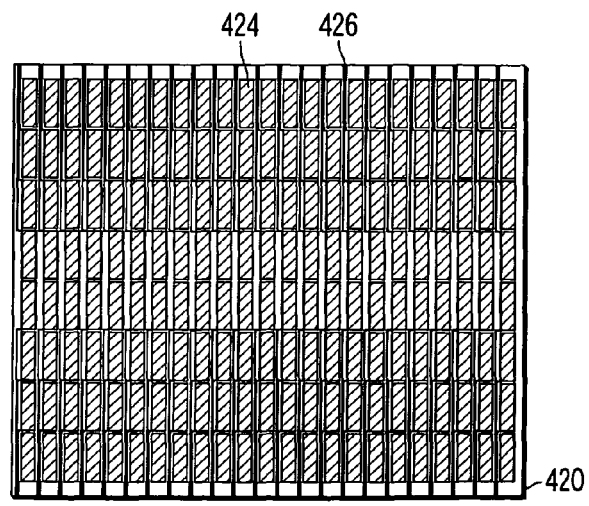
FIG. 5C is a front view schematically showing another structure of the shutter integrated into the three-dimensional image display apparatus shown in FIGS. 5A.

In the example of structure shown in FIGS. 5A and 5B, the substrate 420 provided with the horizontal electrodes 423 installed on the observer's side. The horizontal electrode 423 is formed on the insulating layer 421. The light blocking potions 422 are formed on the substrate 420 located under the insulating layer 421. The liquid crystal material 425 is filled between the substrates 420. As in the case of the example of structure shown in FIG. 4, many segmented vertical electrodes 424 are arranged to have a positional relation between the vertical electrodes 424 and the lenses of the lenticular plate 403. Thus, the number of the electrodes corresponds to that of the lenses of the lenticular plate 402. Each of the vertical electrodes 424 is separated into several to several tens of areas arranged along a substantially vertical direction. That is, as in the case of the example of structure shown in FIGS. 4A and 4B, the plurality of vertical electrodes 424 are arranged at predetermined intervals in a substantially horizontal direction. Each of the light blocking portions 422 is formed to have a width slightly larger than the gap between the vertical electrodes 424. Wires 426 are formed in areas on the substrate 420 which are covered by the corresponding light blocking portion 422. The wires 426 connect to the respective areas of the vertical electrode 424 into which the vertical electrode 424 is separated in the substantially vertical direction. Accordingly, in the example of structure shown in FIGS. SA and SB, the separate areas of the vertical electrode 424, arranged in the substantially vertical direction, can be individually driven. FIG. 5C shows an example of the shapes of the areas of the vertical electrode 424 into which the vertical electrode 424 is separated in the substantially vertical direction and of the wires 426, connected to the respective areas.

Figure 6:
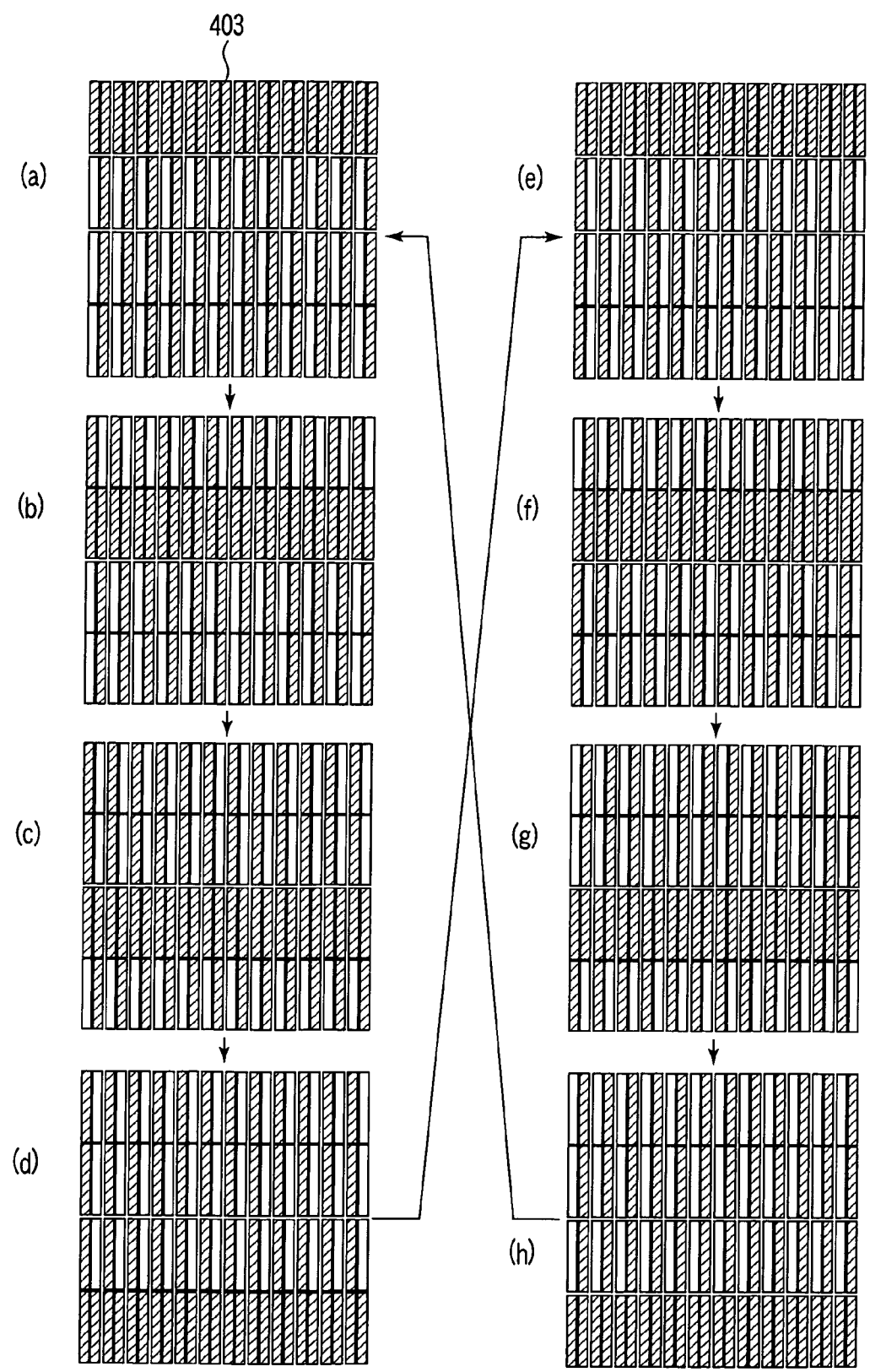
FIG. 6 is a schematic diagram showing the concept of transition between a transmitted state and a shutoff state within one frame in the shutter integrated into the three-dimensional image display apparatus shown in FIGS. 1 to 3.

FIGS. 6(*a*) to 6(*h*) are conceptual drawings showing the temporal transition of the transmitted and shutoff states within one frame of the shutter cell 403. In FIGS. 6(*a*) to 6(*h*), it is a prerequisite that one frame is composed of two fields (n=2). In FIGS. 6(*a*) to 6(*h*), the numbers of vertical and horizontal electrodes are smaller than those in the actual shutter cell 403 for conceptual description. FIGS. 6(*a*) to 6(*h*) correspond to the case where the number (n) of time divisions is 2. The left column shown in FIGS. 6(*a*) to 6(*d*) shows a time division multiplexing display in the first field. The right column shown in FIGS. 6(*e*) to 6(*h*) shows a time division multiplexing display in the second field.

The shutter cell 403 is driven so as to sequentially change the shutter element row in the transmitted state as shown in FIGS. 6(*a*) to 6(*d*) and FIGS. 6(*e*) to 6(*h*), that is, in such a way that the image is scrolled vertically from top to bottom. The scrolling is in synchronization with rewriting operations performed by the display apparatus, that is, the scanning of pixel rows. Such a structure and a driving method make it possible to prevent the crosstalk between time division fields. By bringing all the series of shutter elements located near the pixel row being scanned, into the shutoff state upon switching as in the case of this example, it is possible to suppress crosstalk even if the display apparatus has an insufficient response speed.

More generally, for the number n of time divisions, the driving method involves bringing every n laterally arranged shutter elements into the transmitted state and sequentially changing the shutter elements in the transmitted state for each of n fields into which a frame is divided. With the driving method, to display one field on the pixel surface, every n shutter element columns in the shutter cell 403 are kept open during a scan period for one field. To display the next one field, the opened shutter elements of the shutter cell 403 are shifted by one column. Then, every n shutter element columns are kept open during a scan period of one field on the basis of the shifted columns. Such display driving is carried out to display one frame consisting of n fields.

In the example of driving shown in FIGS. 6(*a*) to 6(*h*), four areas (the number m of parts into which the vertical electrode is divided=4) in the shutter 403 are sequentially scanned. Every two shutter element columns (the number n of time divisions=2) are opened and closed. Elemental image boundaries in the pixel surface 406 are correspondingly switched. With reference to this example, the driving method will be described in further detail. FIGS. 6(*a*) to 6(*h*), showing eight states of the shutter 403, correspond to FIGS. 7(*i*) to 7(*p*), respectively, showing eight states of the pixel surface 406.

Figure 7:
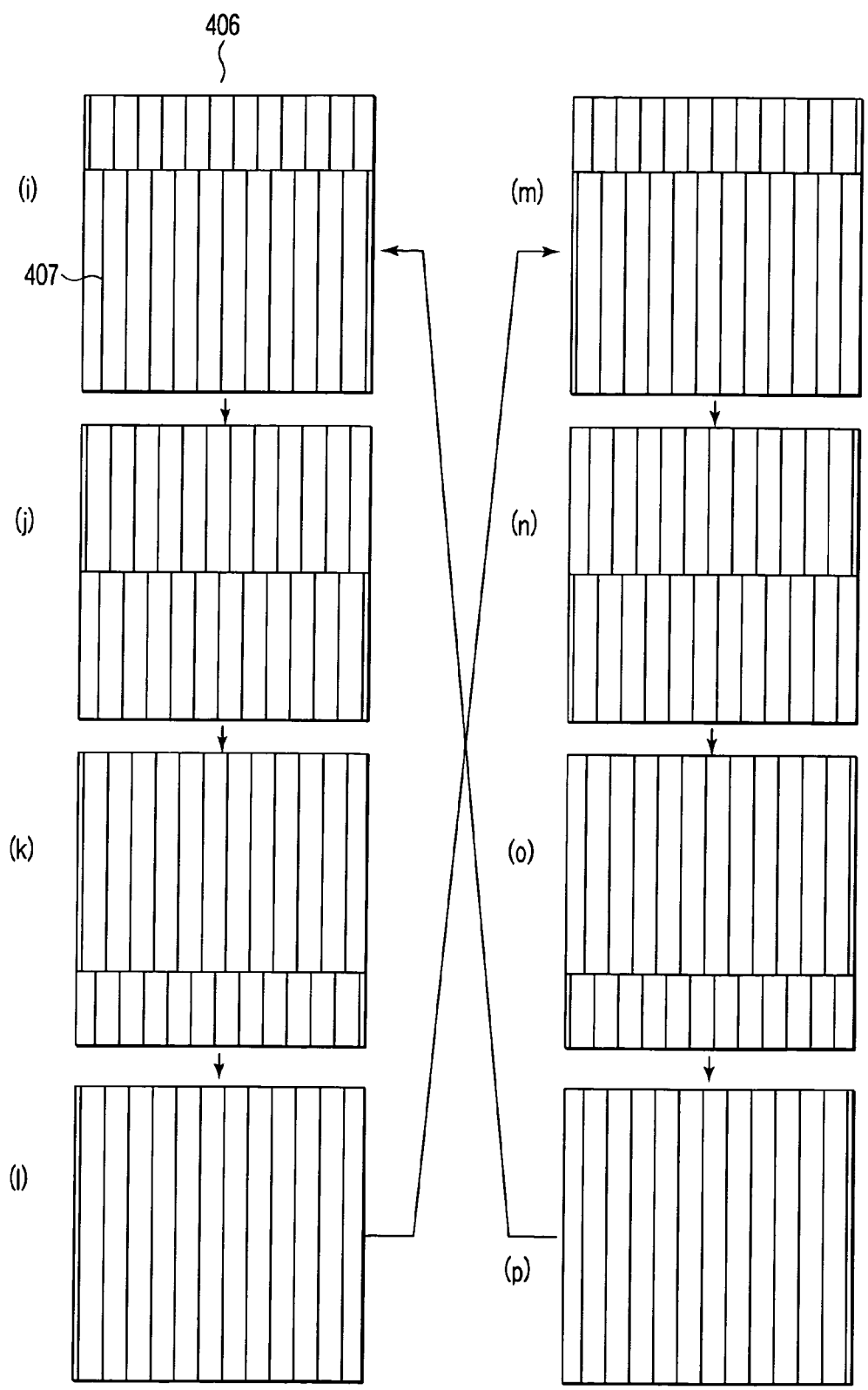
FIG. 7 is a schematic diagram showing the concept of transition of arrangement of elemental images on a pixel surface corresponding to FIG. 6.

First, FIG. 7(*i*) shows the state in which the pixel surface 406 is linearly sequentially driven to scan every pixel row and in which a quarter of the pixel surface from its upper end has been scanned. The elemental image of the current field is displayed in the area corresponding to the quarter of the pixel surface 406 from its upper end. The elemental images corresponding to the slits or lenses opened for the preceding field are displayed in the area corresponding to the three-fourths of the pixel surface from its lower end. Since every two shutter element columns are opened, the odd numbered (first, third, fifth, . . . ) shutter element columns are opened. In FIG. 7(*i*), the open shutter elements are located in the area corresponding to the preceding frame. The shutter elements located near the pixel being scanned (the area corresponding to the quarter of the pixel surface from its top) are closed. In FIG. 6(*a*), the closed shutter elements are shaded, while the open shutter elements are shown as spaces.

Then, FIG. 7(*j*) shows the state in which the pixel surface 406 is linearly sequentially driven to scan every pixel row and in which the upper half of the pixel surface has been scanned. The elemental image of the current field is displayed in the area corresponding to the half of the pixel surface 406 from its upper end. The elemental images corresponding to the slits or lenses opened for the preceding field are displayed in the area corresponding to the lower half of the pixel surface. In the preceding frame, the shutter elements in the odd numbered (first, third, fifth, . . . ) columns are opened. However, in the current frame, the shutter elements in the even numbered (second, fourth, sixth, . . . ) columns are opened. The shutter elements located near the pixel being scanned (the second area from the upper end) are closed. Subsequently, as shown in FIGS. 7(*k*) and 7(*l*), the pixel surface 406 is scanned to display an elemental image. Correspondingly, as shown in FIGS. 6(*c*) and 6(*d*), predetermined shutter elements of the shutter 403 are closed and opened. Similarly, the even numbered (second, fourth, sixth, . . . ) shutter element areas are opened.

Once the linear sequential scanning (display of the elemental images) is finished to the lower end of the pixel surface 406, the elemental image of the first field is displayed on the pixel surface 406. During scanning of the first field, the even numbered shutter element columns are open. The even numbered shutter element columns correspond to the already described areas of the even numbered columns of the vertical electrodes 424. Consequently, the lenses or slits in the even numbered columns function as projecting lenses or slits; the lenses or slits are located opposite the areas of the vertical electrodes 424 in the even numbered columns. The elemental images corresponding to the projecting lenses or slits are projected on the observer. As a result, the projected elemental images are synthesized to generate a three-dimensional image corresponding to a visible first field.

To display the image in the next second field, the shutter elements in the even numbered columns (second column, fourth column, . . . ) are sequentially closed, while the shutter elements in the odd numbered (first, third, fifth, . . . ) columns are sequentially opened, as shown in FIGS. 6(e) to 6(h). The pixel surface 406 is scanned in synchronization with this operation starting with its upper end as shown in FIG. 7(m); every pixel row is linearly sequentially driven to display the elemental images corresponding to the slits or lenses. Subsequently, as shown in FIGS. 7(n) to 7(p), the pixel surface 406 is scanned downward to sequentially display the elemental images corresponding to the slits or lenses. The lenses or slits in the odd numbered columns function as projecting lenses or slits; the lenses or slits are located opposite the areas of the vertical electrodes 424 in the odd numbered columns. The elemental images corresponding to the projecting lenses or slits are projected on the observer. As a result, the projected elemental images are synthesized to generate a three-dimensional image corresponding to a visible second field. When the opening and closing of the shutter in FIGS. 6(a) to 6(h) is synchronized with the display of elemental images in FIGS. 7(i) to 7(p), three-dimensional images corresponding to the first and second fields are generated to display a three-dimensional image of one frame.

In the example of driving shown in FIGS. 6(a) to 6(h), the elemental images displayed (rewritten) in the first field shown in FIGS. 7(i) to 7(l) correspond to the lenses or slits in the even numbered columns. The elemental images displayed (rewritten) in the second field shown in FIGS. 7(m) to 7(p) correspond to the lenses or slits in the odd numbered columns. In a three-dimensional display apparatus not provided with any shutter, the elemental images corresponding to the lenses or slits in the odd and even numbered columns, that is, all the lenses or slits, are displayed on the pixel surface 406 so that the elemental images are arranged in the same manner for all the fields. In contrast, the pixel elements corresponding to the lenses or slits in the odd and even numbered columns are displayed on the pixel surface 406 so as to be arranged in different manners for the respective fields. Consequently, in the example of driving shown in FIG. 6, in each field, the lenses or slits the number of which is half (n=2) the total number are made effective. The elemental images corresponding to the lenses or slits can be correspondingly displayed so as to have a width on the pixel surface 406 which is double that in normal three-dimensional display. This makes it possible to double the size of viewing zone of the displayed three-dimensional image or the depth reproduction range compared to those in normal display.

Thus, the shutter has only to be able to exhibit two states, the transmitted and shutoff states, and to be opened and closed quickly enough to complete a response in a time shorter than one field. With a bistable ferroelectric liquid crystal, the shutter can be driven so as to exhibit a transmission state pattern such as the one described above using a simple matrix such as the one shown in FIG. 4. Further, with a bistable twisted nematic liquid crystal or a pi-cell (bend alignment nematic liquid crystal), the shutter can be driven so as to exhibit a transmission state pattern such as the one described above using cells individually connected to respective shutter elements as shown in FIG. 5.

Figure 8:
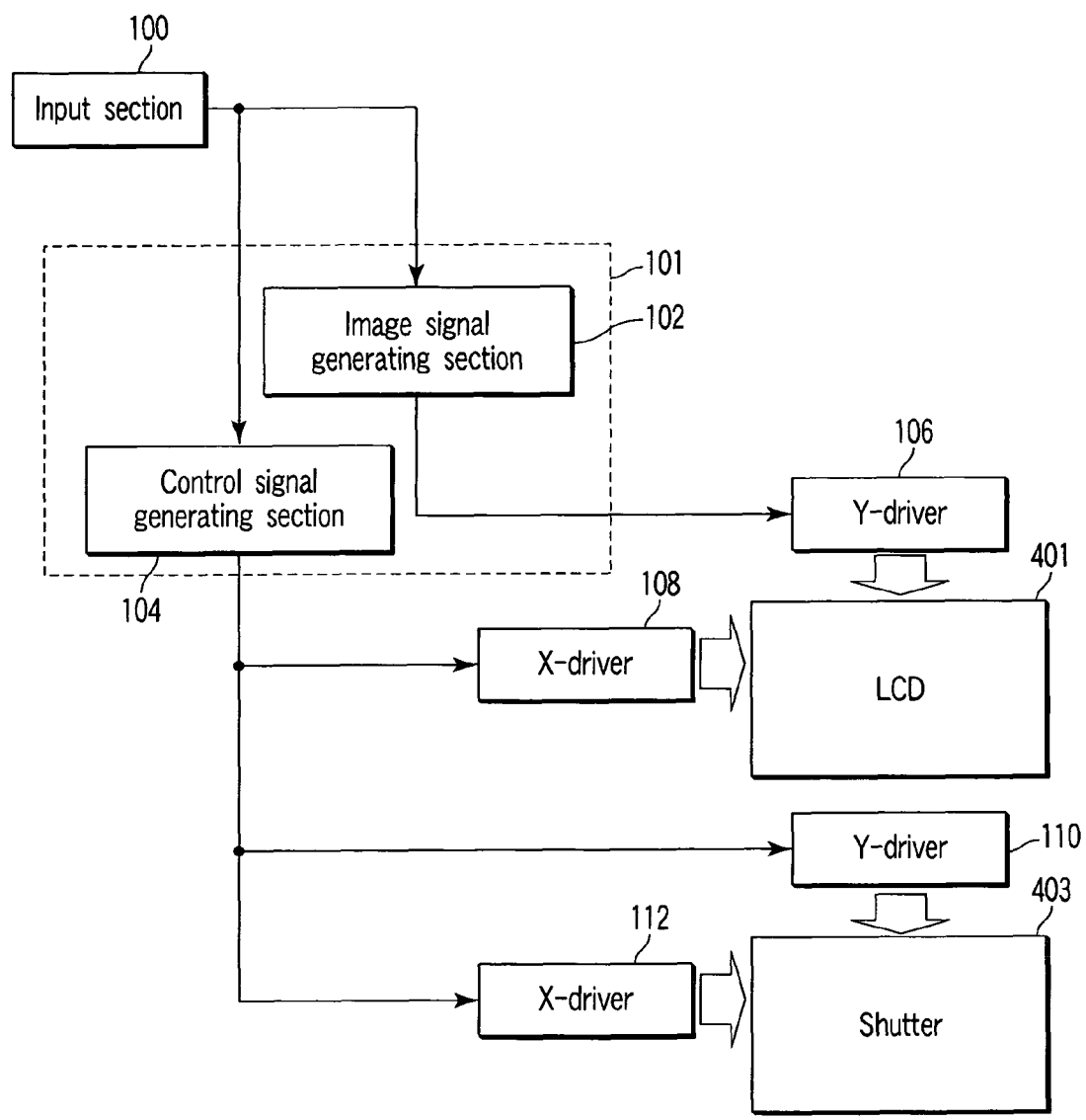
FIG. 8 is a block diagram showing the configuration of a circuit driving the three-dimensional image display device shown in FIGS. 1 to 3.

FIG. 8 is a block diagram schematically showing a control device that synchronistically drives the display apparatus, in the present embodiment, LCD 401 and the shutter 403.

As shown in FIG. 8, an input section 100 inputs an image signal to a control section 101 as an input signal. The image signal contains elemental images to be displayed on LCD 401. When provided to an image signal generating section 102, the image signal is separated into a first component signal to be displayed in the first field and a second component signal to be displayed in the second field. The first and second component signals are used to display a group of elemental images corresponding to the lenses or slits in the odd and even numbered columns (n=2) as described with reference to FIG. 6.

The input section inputs a synchronizing signal to a control signal generating section 108 to control a vertical scan signal for the first field and a vertical scan signal for the second field. Further, a shutter open and close signal is generated which is in synchronization with the vertical scan signals for the first and second fields. Furthermore, a vertical driving signal and a horizontal driving signal are generated which correspond to the shutter open and close signal.

To display the first field image, a Y driver 106 of LCD 401 is provided with the first component signal to be displayed in the first field. An X driver 108 of LCD 401 is provided with the vertical scan signal. Accordingly, as shown in FIGS. 7(i) to 7(l), the elemental images corresponding to the slits or lenses are sequentially displayed starting with the upper end of the pixel surface 406. Further, the vertical and horizontal driving signals corresponding to the shutter open and close signal are applied to the X driver 112 and Y driver 110 of the shutter 403. Thus, as shown in FIGS. 6(a) to 6(d), the shutter elements in the even numbered (second, fourth, . . . ) columns are sequentially opened starting with the upper end.

To display the second field image after displaying the first field, the Y driver 106 of LCD 401 is provided with the second component signal to be displayed in the second field. The X driver 108 of LCD 401 is provided with the vertical scan signal. Accordingly, as shown in FIGS. 7(m) to 7(p), the elemental images corresponding to the slits or lenses are sequentially displayed starting with the upper end of the pixel surface 406. Further, the vertical and horizontal driving signals corresponding to the shutter open and close signal are applied to the X driver 112 and Y driver 110 of the shutter 403. Thus, as shown in FIGS. 6(e) to 6(h), the shutter elements in the odd numbered (first, third, . . . ) columns of the shutter 403 are sequentially opened starting with the upper end.

In the driving circuit shown in FIG. 8, the arrangement of the elemental images is switched for each field. However, the arrangement of the elemental images can be switched by executing time division multiplexing while an image input signal is being produced outside the display apparatus. When the elemental images are displayed, the control section 101 causes the shutter 403 to synchronize with the display. Timing for synchronization is controlled as follows. Before or after the upper end of a certain shutter element row is reached by a pixel row at which the elemental images are switched in the pixel surface 406 of LCD 401, the shutter element row is brought into the shutoff state. Before or after the lower end of a certain shutter element row is reached by a pixel row at which the elemental images are switched, the shutter elements in the even or odd numbered columns are brought into the transmitted state, these shutter elements are contained in the above shutter element row and corresponding to the elemental images resulting from the switching. On this occasion, if the pixels of the display apparatus located at the upper end of the shutter element row have not completed a response, the time when the shutter element row is brought into the transmitted state may be delayed so that a plurality of shutter element rows are simultaneously brought into the shutoff state. In contrast, if the display apparatus such as LCD responds sufficiently quickly and impulse display is provided, the specific shutter element rows need not simultaneously be brought into the shutoff state. Instead, before or after the pixel row at which the elemental images are switched reaches the upper end of the shutter element row, the shutter elements in the transmitted state may be switched.

Further, in a mode in which time division multiplexing is not carried out, control may be switched so that the entire shutter is kept in the transmitted state. Such a non-time-division multiplexing display mode is effective in improving luminance or performing a maintenance operation. If there is a great difference in luminance between a time division state and a non-time-division state, it is possible to further control and adjust the luminance of the backlight or display apparatus.

Figure 9:
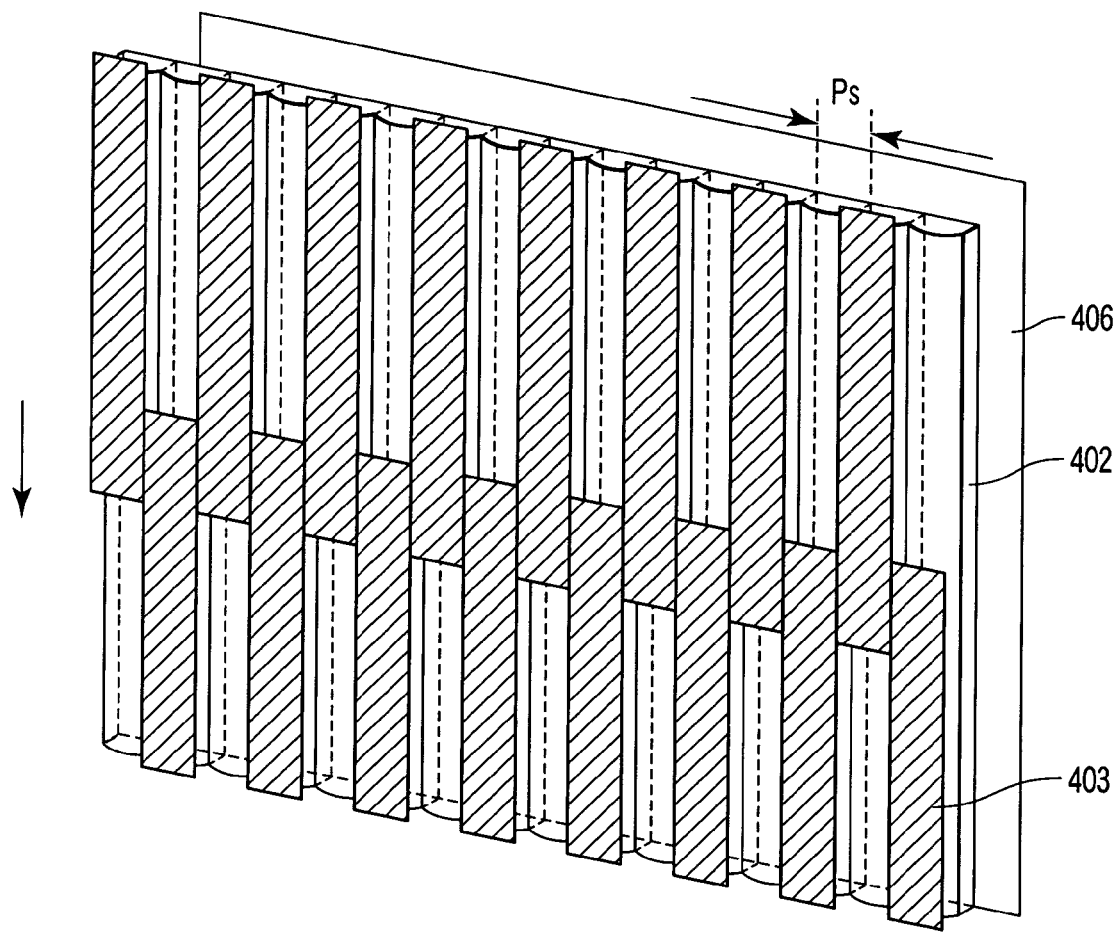
FIG. 9 is a schematic diagram conceptually showing an operation of opening or closing the shutter during driving in the three-dimensional image display apparatus shown in FIGS. 1 to 3.

The above configuration and control method execute time division multiplexing such that the lenses in the transmitted state are switched for each field to sequentially switch the lenses from top to bottom as shown in FIG. 9. In FIG. 9, it should be noted that the closed areas of the shutter cell 403 are shown in black and that the first and second areas of the pixel surface 406, closed in the first and second fields, respectively, are simultaneously shown.

Figure 10A:
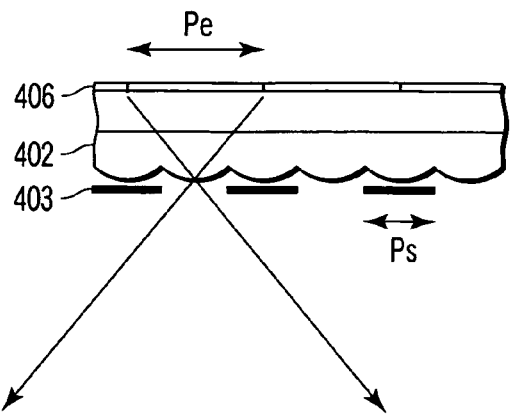
FIGS. 10A to 10E are schematic diagrams conceptually showing how to double the viewing zone size, resolution, and depth reproduction range (beam density) of the three-dimensional image display apparatus shown in FIGS. 1 to 3.
Figure 10B:
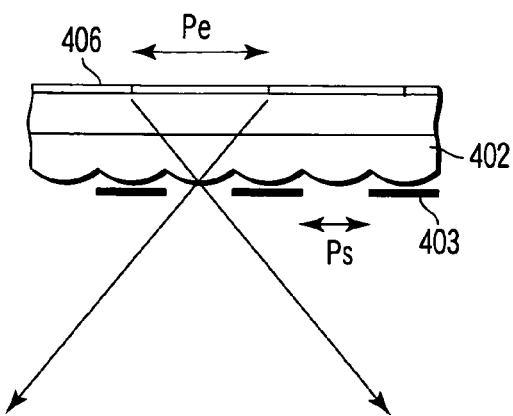

FIGS. 10A and 10B show horizontal cross sections of the three-dimensional image display apparatus in accordance with the present invention. FIGS. 10A and 10B show a difference in the arrangement of the elemental images (width Pe) between different fields. FIG. 10A shows the region of beams observed when the shutter areas in the even numbered columns in the first field are opened to allow the lenses in the even numbered rows to project the corresponding elemental images. FIG. 10B shows the region of beams observed when the shutter areas in the odd numbered columns in the second field are opened to allow the lenses in the odd numbered rows to project the corresponding elemental images. In the example shown in FIGS. 10A and 10B, the number of time divisions is 2, the horizontal position of the elemental images is switched by one lens pitch Ps at the even or odd numbered fields. If the number of time divisions is n, the horizontal position of the elemental images is moved by one lens pitch Ps at each field.

As shown in FIGS. 10A and 10B, the elemental image width Pe is set about twice as large as the lens pitch Ps (n=2). A lens adjacent to a certain lens is not utilized for projection of elemental images. The area on the display screen 406 corresponding to the idle adjacent lens can be utilized as an area on which an image is projected using the effective lens. In contrast, FIG. 10E relates to a normal three-dimensional image display system that does not carry out time division multiplexing. In this case, the shutter cell 403 is not provided, so that all the lenses are simultaneously utilized for projection of elemental images. The elemental images corresponding to adjacent lenses are arranged adjacent to each other. The elemental image width Pe is almost the same as the lens pitch Ps. Consequently, the display of elemental images shown in FIGS. 10A and 10B enables the utilization of a double area compared to the normal display of elemental images shown in FIG. 10E. This makes it possible to double the size of the viewing zone in three-dimensional display.

Figure 10C:
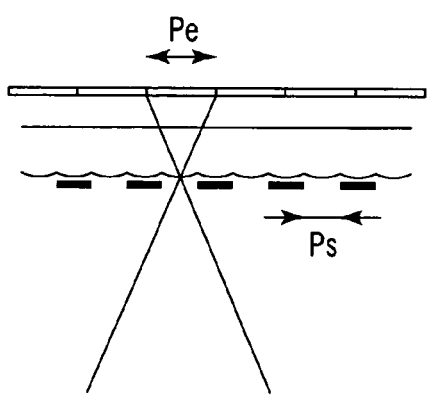
Figure 10D:
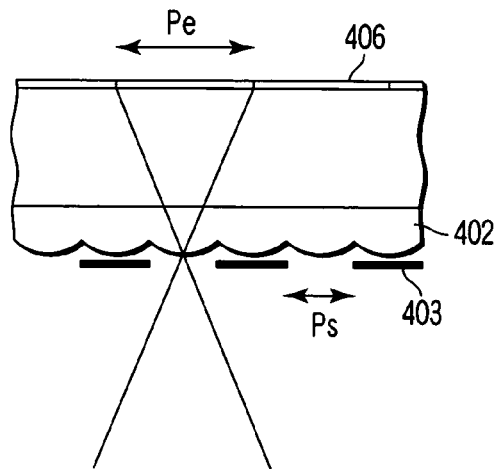
Figure 10E:
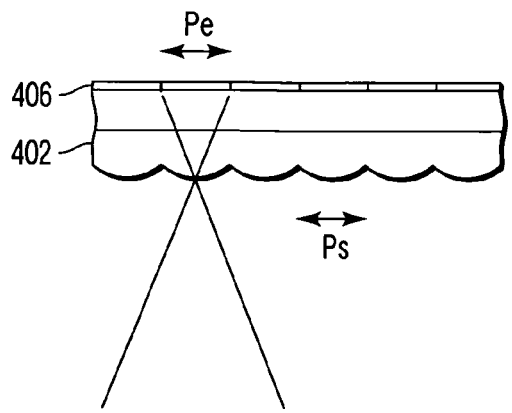

FIG. 10C shows an example in which the elemental image width Pe is similar to that in FIG. 10E but in which the lens pitch Ps is set half that in FIG. 10E. Since the lens pitch Ps is reduced to half, the shutter pitch (almost equal to Ps) of the shutter cell 403 shown in FIG. 10C is set half that in FIGS. 10A and 10B. With the structure shown in FIG. 10C, the lens pitch Ps and shutter pitch reduced to half make it possible to double the resolution compared to that in the normal display shown in FIG. 10E.

FIG. 10D shows an example in which the gap between the lens and the pixel surface 406 is set larger than that in FIGS. 10A, 10B, 10C, and 10E. Even with the same pixel image width as that shown in FIGS. 10A and 10B, the size of the viewing zone decreases (as in the case of FIG. 10E) with increasing size of the gap between the lens and the pixel surface 406. However, as long as the pixel pitch of the display apparatus remains unchanged, the beam density of beams emitted by the elemental images through the corresponding lenses is higher than those in FIGS. 10A, 10B, 10C, and 10E. This makes it possible to double the depth reproduction range of displayed three-dimensional images.

In the structures shown in FIGS. 10A, 10B, 10C and 10D, the shutter cell is placed on the convex surface side of the lenticular plate 402 in proximity to the lenticular plate 402. This makes it possible to suppress the positional deviation between the lens and the shutter associated with the eye point.

Figure 11:
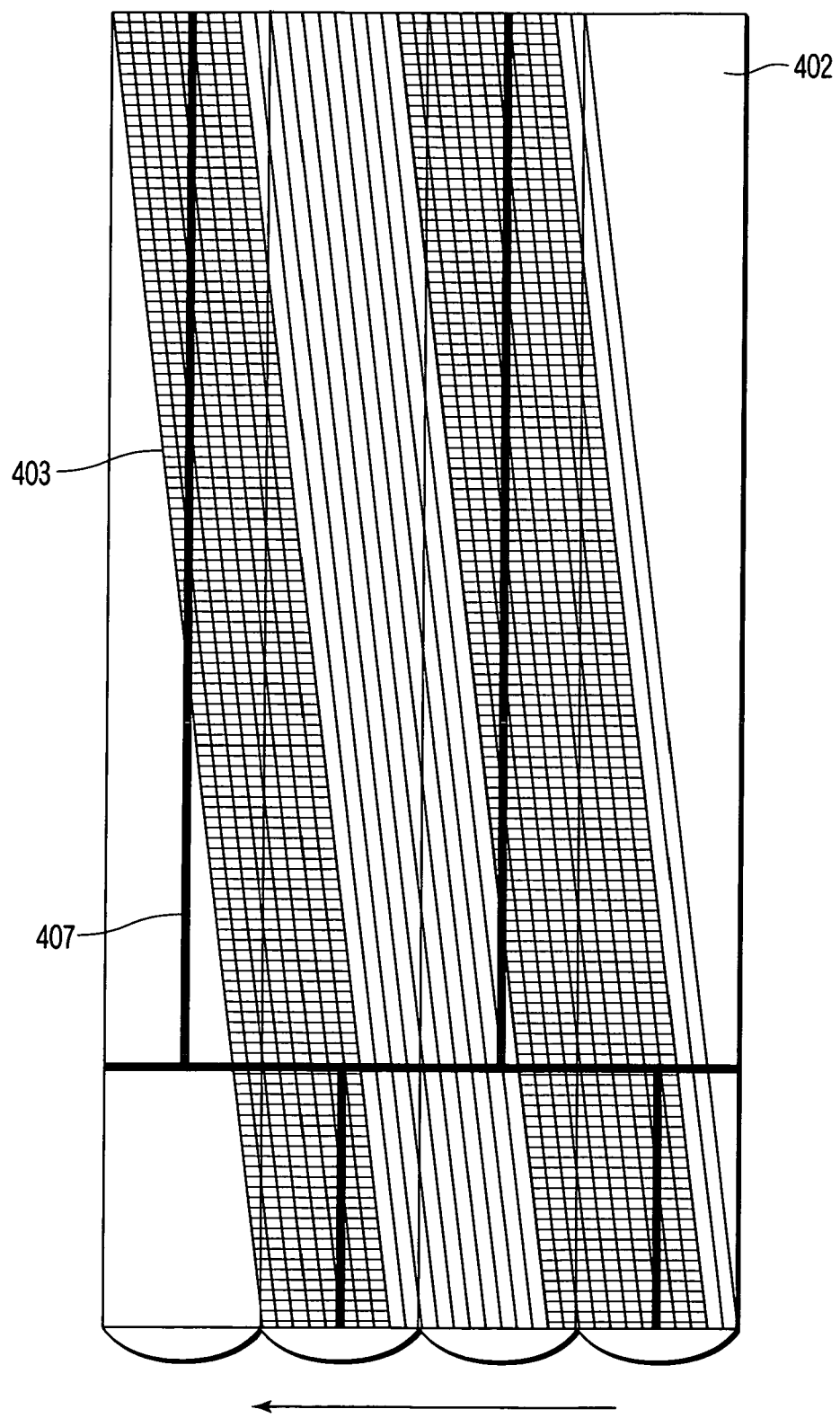
FIG. 11 is a schematic diagram schematically showing the positional relationship between a shutter and lenses integrated into a three-dimensional display apparatus in accordance with a fourth embodiment of the present invention.

FIG. 11 conceptually shows a part of a front view of the shutter cell 403 and lenticular plate adopted for a three-dimensional image display apparatus in accordance with a fourth embodiment of the present invention. In this front view, the display screen is drawn from its upper end to lower end. However, the display screen is enlarged in a lateral direction and only partly shown. Accordingly, FIG. 11 shows only some of the shutter elements of the shutter cell 403, but the shutter cell 403 is actually placed so as to cover the entire pixel surface 406. The shutter cell 403 shown in FIG. 11 comprises a structure that switches between the transmitted state and the shutoff state for each shutter element the width of which is smaller than that of the lens and which is divided into areas extending obliquely to the lens. In this case, in the vertical direction, the shutter elements extend continuously from the end to end of the shutter cell and are not divided. However, each of the shutter elements may be divided into two parts if the pixel surface of LCD or the like can be divided into an upper and lower parts that can be independently driven. In FIG. 11, white shutter elements show areas through which beams can be transmitted. Gray shutter elements show areas that block beams.

In the shutter cell 403 shown in FIG. 11, the shutter elements are in the transmitted state for a period corresponding to the lens width at a period of two lenses. For each of two fields into which the frame is divided, the group of shutter elements in the transmitted state is driven to be sequentially changed so as to move the distance equal to the lens width. In each field, the shutter elements are driven so that the transmitted or shutoff areas move sequentially in the direction of arrow in synchronization with the display apparatus. The shutter elements are closed in synchronization with the switching of the elemental images so that the elemental image boundary 407 is always located opposite the light blocking portion 422 of the shutter. Changes in the arrangement of the elemental images are similar to those shown in FIGS. 7($i$) to 7($p$). Such a configuration also enables time division multiplexing such that elemental images are sequentially switched from the upper end to lower end of the pixel surface. Accordingly, as described with reference to FIG. 10, it is possible to double one of the size of the viewing zone, the resolution, and the depth reproduction range. The crosstalk between the fields is also suppressed. However, the suppression effect of the fourth embodiment is slightly lower than those of the first to third embodiments because in the fourth embodiment, the elemental image boundary 407 may deviate from the center of zone of the closed shutter elements. Accordingly, the crosstalk may further be suppressed by making the zone of the open shutter elements narrower than the zone of the closed shutter elements.

Figure 12:
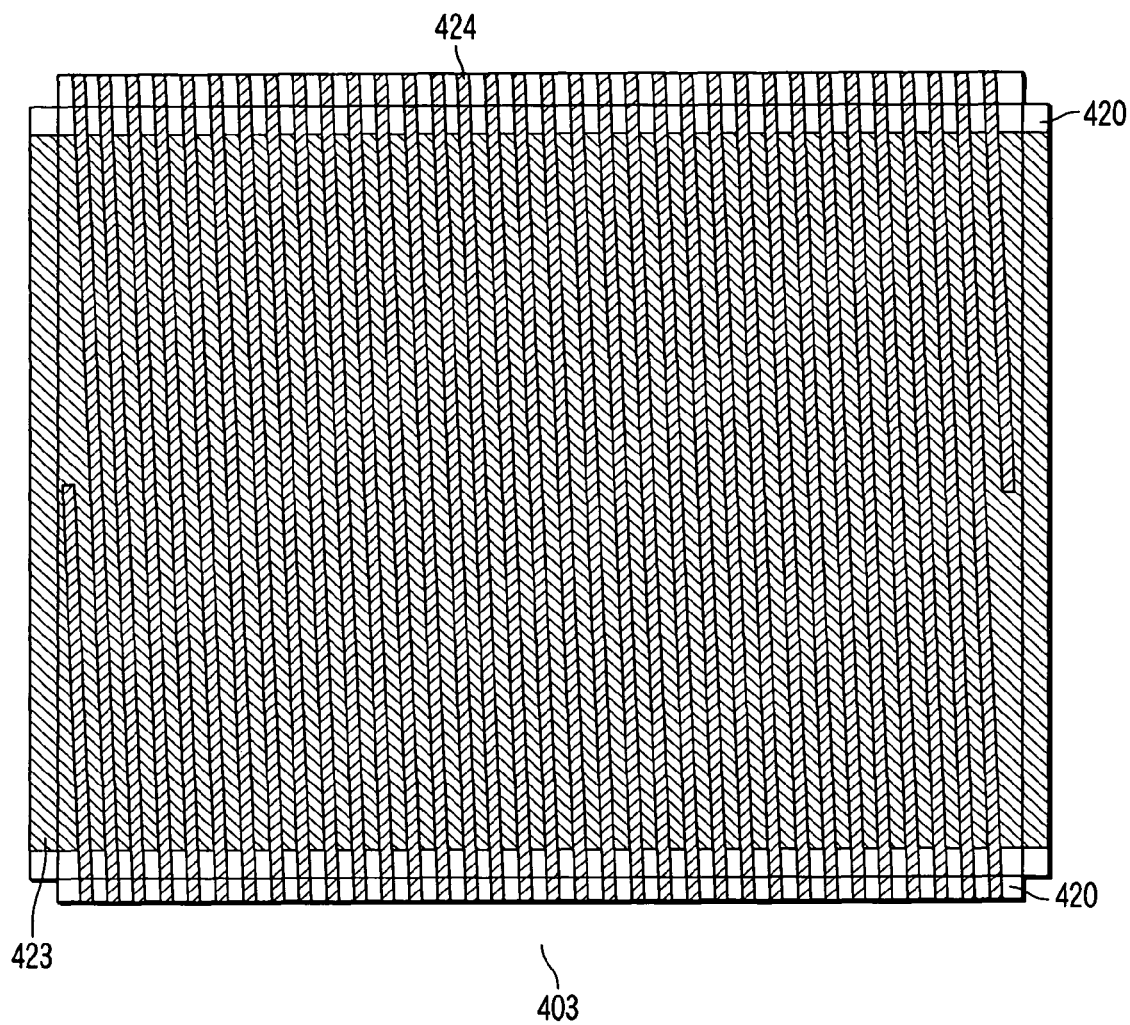
FIG. 12 is a front view schematically showing the shutter integrated into the three-dimensional display apparatus in accordance with the fourth embodiment of the present invention.

FIG. 12 is a front view of the shutter cell 403 used for the three-dimensional image display apparatus in accordance with the fourth embodiment of the present invention. Similarly to the shutter cell shown in FIG. 5B, the shutter cell 403 shown in FIG. 12 is composed of the substrates 420 consisting of two glass plates or the like. The common electrode 423 and the vertical electrode 424 are formed on the inner surfaces of the two substrates 420; the common electrode 423 has terminals in a substantially horizontal direction. The liquid crystal material 425 is filled between the substrates 420. The vertical electrode 424 is obliquely divided into parts which correspond to the lenses of the lenticular plate 402 but each of which is thinner than the corresponding lens. The vertical electrode 424 is formed so that its upper and lower end are offset from the upper and lower ends, respectively, of the common electrode by a distance equal to the width of one lens.

FIG. 13 conceptually shows a part of a front view of the shutter cell 403 and lenticular plate adopted for a three-dimensional image display apparatus in accordance with a fifth embodiment of the present invention. In this front view, the display screen is drawn from its upper end to lower end. However, the display screen is enlarged in a lateral direction and only partly shown. Accordingly, like FIG. 11, FIG. 13 shows only some of the shutter elements of the shutter cell 403, but the shutter cell 403 is actually placed so as to cover the entire pixel surface 406. The lenses of the lenticular plate 402 are obliquely arranged. The shutter cell 403 comprises a structure that switches between the transmitted state and the shutoff state for each shutter element the width of which is smaller than that of the lens and which is divided into areas extending in an oblique direction slightly different from that of the lens. In this case, in the vertical direction, the shutter elements extend continuously from the end to end of the shutter cell and are not divided. If the lenses of the lenticular plate 402 are thus obliquely arranged, the elemental images are also obliquely extended. However, switching the elemental image boundary 407 for each field enables time division multiplexing such that elemental images are sequentially switched from the upper end to lower end of the pixel surface as in the fourth embodiment shown in FIG. 11. Accordingly, as described with reference to FIG. 10, it is possible to double one of the size of the viewing zone, the resolution, and the depth reproduction range.

Figure 15:
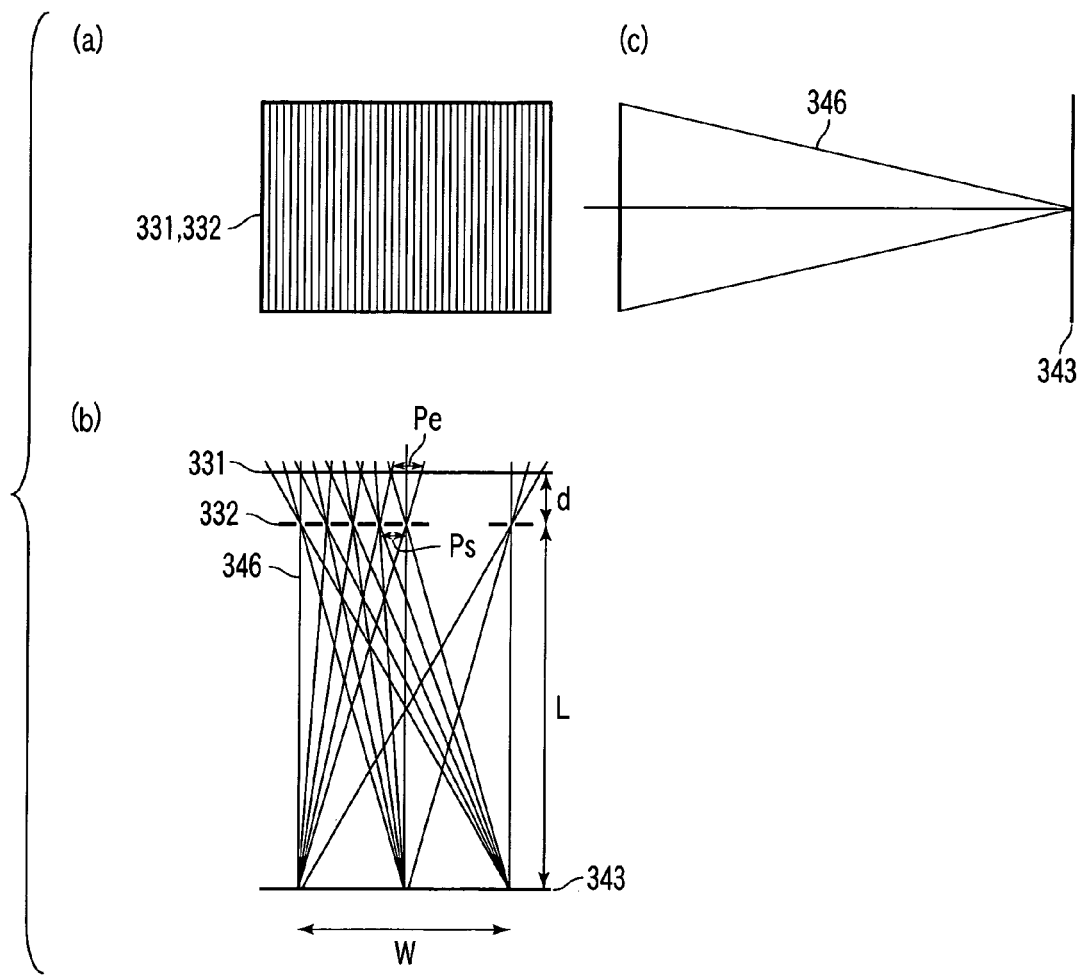
FIG. 15 is a schematic diagram showing the relationship among elemental image pitch Pe, beam control device pitch Ps, gap d, viewing distance L, and viewing zone width W in a three-dimensional display apparatus in accordance with an embodiment of the present invention.

Now, with reference to FIGS. 14 and 15, description will be given of three-dimensional display provided using parallax image arrangement based on the multiview system or one-dimensional IP system. The display of a three-dimensional image shown in FIGS. 14 and 15 is combined with the display apparatus and method described with reference to FIGS. 1 to 13, for implementation.

In both the IP system and multiview system, the viewing distance is normally finite. Thus, a display image is formed so that a projected image is actually visible at the assumed viewing distance. In general, a projected image is formed by executing image processing (in the case of computer graphics, rendering) for each intersecting point (projection center) between a horizontal line (eye point height position) on the viewing distance surface and a line joining a pixel and an optical aperture (slit or lens).

FIG. 14A is a perspective view of the lenticular plate 402, serving as a beam control device. FIG. 14B is a perspective view of a slit 333. Either of the lenticular plate 402 and slit 333, shown in FIGS. 14A and 14B, can be utilized as a beam control device. As already described, the shutter can also be used as a slit.

FIGS. 15(a), 15(b), and 15(c) are a front view of the display module of the three-dimensional image display apparatus and developments schematically showing the region of beams in a vertical plane and a horizontal plane with reference to the display module. That is, FIG. 15(a) shows a front view of a two-dimensional image display module 331 and a parallax barrier 332. FIG. 15(b) shows a plan view showing the arrangement of an image carried out by the three-dimensional display apparatus. FIG. 15(c) shows a side view of the three-dimensional image display apparatus.

As shown in FIGS. 15(a), 15(b), and 15(c), the three-dimensional image apparatus comprises the two-dimensional image display module 331 such as a liquid crystal display element (LCD) and the beam control device 332 having optical apertures. The beam control device 332 corresponds to a kind of optical aperture. As shown in FIGS. 14A and 14B, the optical apertures extend linearly in a substantially vertical direction and are periodically arranged in a substantially horizontal direction. The optical apertures thus constitute the lenticular plate 402 or slit 333. With the three-dimensional image display apparatus, when observing the display apparatus 331 via the beam control device 332 from the positions of the eyes, the observer can observe a three-dimensional image in front of and behind the two-dimensional image display module 331.

In this case, the number of pixels in the two-dimensional image display module 331 is 1,920 in a substantially horizontal direction and 1,200 in a substantially vertical direction as counted on the basis of the minimum unit of pixel group constituting a square. Each minimum unit of pixel group contains red (R), green (G), and blue (B) sub-pixels.

In FIGS. 15(a) to 15(c), with the viewing distance L between the beam control device 332 and the viewing distance surface 343, the horizontal pitch (lens pitch or slit pitch) Ps of the apertures in the beam control device, and the gap d, the pitch Pe of the elemental images (measured without any time division multiplexing) is determined from the distance between the eye point on the visual distance surface 343 and an aperture center projected on the display device. Reference numeral 346 denotes a line joining the eye point position with each aperture center. The viewing zone width W is determined on the basis of the condition that the elemental images do not overlap on the display surface of the display apparatus. The time division multiplexing (the number of divisions n) makes Pe about n times as large as Ps as shown in FIG. 10. Selecting any of the designs in FIGS. 10A, 10B, and 10C makes any of the size of the viewing zone W, the resolution (1/Ps), and the depth reproduction range (beam density) n times as large as the corresponding reference in FIGS. 15(a) to 15(c).

With the one-dimensional IP system, the straight line 346 does not always pass through each pixel on the display screen of the display apparatus. In contrast, with the multiview system, the line joining the eye point position with the center of each aperture and coincides with the trajectory of a beam. If the horizontal pitch Ps of the apertures is an integral multiple of the (sub-)pixel pitch Pp, the pitch Pe of the elemental images includes a fraction that makes the pitch Pe significantly deviate from an integral multiple of the pixel pitch Pp. Even if the horizontal pitch Ps of the apertures is not an integral multiple of the pixel pitch Pp, with the one-dimensional IP system, the pitch Pe of the elemental images includes a fraction that makes the pitch Pe significantly deviate from an integral multiple of the pixel pitch Pp. In contrast, with the multiview system, the pitch Pe of the elemental images is an integral multiple of the pixel pitch Pp.

Pixels (sub-pixels) with an aspect ratio of 3:1 are linearly arranged in a matrix in the horizontal and vertical directions; the red, green, and blue pixels are alternately arranged in the horizontal direction within the same row and column. This color arrangement is generally called a mosaic arrangement. When one effective pixel is composed of pixels in 18 columns and 6 rows, three-dimensional image display can be provided which provides 18 parallaxes in a substantially vertical direction. With the multiview system, this display structure requires 18 viewpoints and an elemental image pitch corresponding to 18 pixels; the horizontal pitch of the beam control devices is smaller than an 18/n image pitch. If a lenticular plate is used which consists of lenses obliquely extended as shown in FIG. 13, the color arrangement may be a vertical stripe.

With the IP system, for example, in a design in which the 18/n pixel pitch is equal to the parallax barrier pitch Ps resulting in sets of parallel beams, elemental image boundaries occur at intervals each slightly larger than the 18 pixel width (for example, 18.02). Consequently, the elemental image width corresponds to 18 or 19 columns depending on the position in the display surface. That is, the average value of the elemental image pitch is slightly larger than the 18 pixel width. Further, the horizontal pitch of the beam control devices is equal to the 18/n pixel width.

The size of the gap d between the display surface 331 of the display apparatus and the parallax barrier 332 or 402 is set at several mm taking the refractive index of the glass substrates or lens material into account. Thus, when the pitch Ps of the parallax barriers (not the pitch Ps, which may or may not be visible depending on the distance, but the actual pitch Ps of the parallax barriers) is an integral multiple of the pixel pitch Pp, the system is based on one-dimensional integral photography. In contrast, with the multiview system, the elemental image pitch Pe is an integral multiple of the pixel pitch Pp, the system is classified into the multiview type.

With the IP system, an elemental image is composed of 18 or 19 pixel columns. The aperture pitch Ps is equal to the 18/n pixel width. Since the elemental image width is slightly larger than the width of 18 pixel columns, when an elemental image boundary is aligned with the closest pixel column boundary (normal A-D converting system), the number of pixel columns for the apertures is 18 for most apertures but 19 for some. If the number of time divisions is two, the elemental image arrangement is laterally reversed over the entire display surface for each field, for example, as shown in FIGS. 7(i) and 7(m).

As described above, with either the multiview system or the one-dimensional IP system, the three-dimensional image display apparatuses in accordance with the embodiments of the present invention increase any one of the size of the viewing zone, the resolution, and the depth amount by a factor of n. The three-dimensional image display apparatus also suppresses the crosstalk between the fields.

The present invention is not limited to the above embodiments proper. In implementation, the present invention can be embodied by varying the components of the embodiments without departing from the spirit of the present invention. Further, various inventions can be formed by appropriately combining a plurality of the components disclosed in the embodiments. For example, some of the components shown in the embodiments may be omitted. Moreover, components in accordance with different embodiments may be appropriately combined together.

According to the present invention, the three-dimensional image display apparatus based on the multiview system or one-dimensional IP system can increase any one of the size of the viewing zone, the resolution, and the depth amount by a factor of n, while suppressing the crosstalk between the fields.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional image display apparatus comprising:
a display module having a display surface on which pixels are arranged in rows and columns;
a display driver configured to generate field image signals to the display module, the display surface being scanned along the column in accordance with each of the field image signals to display elemental images on the pixels, respectively, and form a field image on the display surface, the field image being sequentially rewritten to form a frame image;
a lens array installed in front of the display module and having a plurality of lenses which include optical apertures linearly extended along the column and which are arranged along the row;
a shutter device installed on a convex surface side of the lens array and including a plurality of shutter elements which are extended substantially along the column and arranged along the row or in rows and columns to have a predetermined relationship with the plurality of lenses; and
a shutter driver configured to drive the shutter device to open a group of the shutter elements and close another group of the shutter elements, simultaneously, and display each of the field image from the shutter device, the group of the shutter elements transmitting light beams from the elemental images through the lenses, while the another group of the closed shutter elements blocks the light beams from the elemental images through the lenses, wherein the shutter driver closes a series of shutter elements which are arranged along the row and corresponds to the row or rows of pixels to be rewritten and then opens the closed shutter elements in synchronization with the rewriting of the row or rows of pixels, the shutter driver sequentially changes the group of the opened shutter elements in synchronization with the scanning of the display surface, and the elemental images are sequentially projected on an observing zone from the display apparatus to form the three-dimensional image.

2. The three-dimensional image display apparatus according to claim 1, wherein the lens array includes a first substrate on which the lens array is formed, and the shutter device includes a second substrate located opposite the first substrate and the shutter elements formed between the first and second substrates.

3. The three-dimensional image display apparatus according to claim 1, wherein each of the shutter elements further comprises light blocking portions provided between the shutter elements.

4. The three-dimensional image display apparatus according to claim 1, wherein each of the shutter elements have a width equal to or smaller than the half width of each of the lenses and are arranged obliquely to the column.

5. The three-dimensional image display apparatus according to claim 1, wherein the lenses and the shutter elements are arranged obliquely to the column of the pixels on the display surface at respective angles to the pixel columns.

6. A method for displaying a three-dimensional image, comprising:
- a display module having a display surface on which pixels are arranged in rows and columns;
- a lens array installed in front of the display module and having a plurality of lenses which include optical apertures linearly extended along the column and which are arranged along the row; and
- a shutter device installed on a convex surface side of the lens array and including a plurality of shutter elements which are extended substantially along the column and arranged along the row or in rows and columns to have a predetermined relationship with the plurality of lenses;

the method comprising:
- generating field image signals to the display module, the display surface being scanned along the column in accordance with each of the field image signals to display elemental images on the pixels, respectively, and form a field image on the display surface, the field image being sequentially rewritten to form a frame image;
- driving the shutter device to open a group of the shutter elements and close another group of the shutter elements, simultaneously, and display each of the field image from the shutter device, the group of the shutter elements transmitting light beams from the elemental images through the lenses, while the another group of the closed shutter elements blocks the light beams from the elemental images through the lenses, wherein driving the shutter device includes closing a series of shutter elements which are arranged along the row and corresponds to the row or rows of pixels to be rewritten and opening the closed shutter elements in synchronization with the rewriting of the row or rows of pixels; and
- changing the group of the opened shutter elements in synchronization with the scanning of the display surface, sequentially, the elemental images being sequentially projected on an observing zone from the display apparatus to form the three-dimensional image.

7. The method for displaying a three-dimensional image according to claim 6, wherein the lens array includes a first substrate on which the lens array is formed, and the shutter device includes a second substrate located opposite the first substrate and the shutter elements formed between the first and second substrates.

8. The method for displaying a three-dimensional image according to claim 6, wherein each of the shutter elements further comprises light blocking portions provided between the shutter elements.

9. The method for displaying a three-dimensional image according to claim 6, wherein each of the shutter elements have a width equal to or smaller than the half width of each of the lenses and are arranged obliquely to the column.

10. The method for displaying a three-dimensional image according to claim 6, wherein the lenses and the shutter elements are arranged obliquely to the column of the pixels on the display surface at respective angles to the pixel columns.

* * * * *

UNITED STATES PATENT AND TRADEMARK OFFICE
CERTIFICATE OF CORRECTION

| | | |
|---|---|---|
| PATENT NO. | : 7,786,953 B2 | Page 1 of 1 |
| APPLICATION NO. | : 11/385712 | |
| DATED | : August 31, 2010 | |
| INVENTOR(S) | : Saishu | |

It is certified that error appears in the above-identified patent and that said Letters Patent is hereby corrected as shown below:

Column 18, line 40, change "image" to --images--.

Column 18, line 67, change "each of the shutter elements have" to --each of the shutter elements has--.

Column 19, line 2, change "are arranged" to --is arranged--.

Column 19, line 30, change "image" to --images--.

Column 20, lines 24-25, change "each of the shutter elements have" to --each of the shutter elements has--.

Column 20, line 26, change "are arranged" to --is arranged--.

Signed and Sealed this
Fifteenth Day of February, 2011

David J. Kappos
*Director of the United States Patent and Trademark Office*